(12) United States Patent
Miller et al.

(10) Patent No.: US 12,044,219 B2
(45) Date of Patent: Jul. 23, 2024

(54) SENSOR SHIFT STRUCTURES IN OPTICAL IMAGE STABILIZATION SUSPENSIONS

(71) Applicant: Hutchinson Technology Incorporated, Hutchinson, MN (US)

(72) Inventors: Mark A. Miller, Hutchinson, MN (US); Peter F. Ladwig, Hutchinson, MN (US); Douglas P. Riemer, Waconia, MN (US); Duane M. Jelkin, Hutchinson, MN (US); John L. Schumann, Litchfield, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 17/549,508

(22) Filed: Dec. 13, 2021

(65) Prior Publication Data

US 2022/0099072 A1     Mar. 31, 2022

Related U.S. Application Data

(63) Continuation of application No. 15/844,296, filed on Dec. 15, 2017, now Pat. No. 11,199,182.

(Continued)

(51) Int. Cl.
*F03G 7/06*     (2006.01)
*F16F 15/00*    (2006.01)
(Continued)

(52) U.S. Cl.
CPC .......... *F03G 7/065* (2013.01); *F03G 7/0614* (2021.08); *F16F 15/005* (2013.01); *F16F 15/06* (2013.01);
(Continued)

(58) Field of Classification Search
CPC ...... F03G 7/065; F03G 7/0614; F16F 15/005; F16F 15/06; F16F 2224/0216;
(Continued)

(56) References Cited

U.S. PATENT DOCUMENTS 5,539,491 A * 7/1996 Toshikatsu ............. G03B 19/04
                                                       396/89
5,862,015 A    1/1999 Evans et al.
(Continued)

FOREIGN PATENT DOCUMENTS

CN      1928612 A      3/2007
CN    101416090 A      4/2009
(Continued)

OTHER PUBLICATIONS

International Search Report and Written Opinion in International Application No. PCT/US2017/066864, mailed Mar. 5, 2018.
(Continued)

*Primary Examiner* — Usman A Khan
(74) *Attorney, Agent, or Firm* — DLA Piper LLP (US)

(57) ABSTRACT

A suspension assembly is described. The suspension assembly including a static member or plate; a moving member or plate movable about an x-axis and a y-axis with respect to the static plate; a sensor mounting region on the moving plate; and one or more shape memory alloy (SMA) elements extending between and coupled to the static plate and moving plate. The SMA elements, when driven by a controller, move the moving plate and the sensor mounting region thereon about the x-axis and the y-axis with respect to the static plate.

20 Claims, 25 Drawing Sheets

Related U.S. Application Data

(60) Provisional application No. 62/435,231, filed on Dec. 16, 2016.

(51) Int. Cl.

| | |
|---|---|
| *F16F 15/06* | (2006.01) |
| *F16M 11/04* | (2006.01) |
| *F16M 11/18* | (2006.01) |
| *F16M 13/02* | (2006.01) |
| *G02B 7/02* | (2021.01) |
| *G02B 7/09* | (2021.01) |
| *G03B 3/10* | (2021.01) |
| *G03B 5/00* | (2021.01) |
| *G03B 13/36* | (2021.01) |
| *H02N 10/00* | (2006.01) |
| *H04N 23/54* | (2023.01) |
| *H04N 23/55* | (2023.01) |
| *H04N 23/68* | (2023.01) |

(52) U.S. Cl.
CPC ........... *F16M 11/045* (2013.01); *F16M 11/18* (2013.01); *F16M 13/022* (2013.01); *G02B 7/023* (2013.01); *G02B 7/09* (2013.01); *G03B 5/00* (2013.01); *H02N 10/00* (2013.01); *H04N 23/54* (2023.01); *H04N 23/55* (2023.01); *H04N 23/6812* (2023.01); *H04N 23/687* (2023.01); *G03B 3/10* (2013.01); *G03B 13/36* (2013.01); *G03B 2205/0007* (2013.01); *G03B 2205/0076* (2013.01)

(58) Field of Classification Search
CPC ............ F16F 2224/0258; F16F 15/002; F16M 11/045; F16M 11/18; F16M 13/022; F16M 11/048; F16M 11/125; G02B 7/023; G02B 7/09; G02B 27/646; G03B 5/00; G03B 3/10; G03B 13/36; G03B 2205/0007; G03B 2205/0076; H02N 10/00; H04N 5/2253; H04N 5/2254; H04N 5/23258; H04N 5/23287; H04N 23/54; H04N 23/55; H04N 23/6812; H04N 23/687
USPC ....................................................... 348/172
See application file for complete search history.

(56) References Cited

U.S. PATENT DOCUMENTS

| | | | |
|---|---|---|---|
| 5,883,759 | A | 3/1999 | Schulz |
| 5,946,163 | A | 8/1999 | Boutaghou et al. |
| 6,002,168 | A | 12/1999 | Bellaar et al. |
| 6,147,840 | A | 11/2000 | Khan |
| 6,823,582 | B1 | 11/2004 | Mostafazadeh et al. |
| 7,384,531 | B1 | 6/2008 | Peltoma et al. |
| 7,388,733 | B2 | 6/2008 | Swanson et al. |
| 7,489,340 | B2 | 2/2009 | Koo et al. |
| 7,929,252 | B1 | 4/2011 | Hentges et al. |
| 8,144,430 | B2 | 3/2012 | Hentges et al. |
| 8,169,746 | B1 | 5/2012 | Rice et al. |
| 8,254,769 | B2 | 8/2012 | Wu et al. |
| 8,593,568 | B2 | 11/2013 | Topliss et al. |
| 8,885,299 | B1 | 11/2014 | Bennin et al. |
| 8,941,951 | B2 | 1/2015 | Bennin et al. |
| 9,175,671 | B2 | 11/2015 | Howarth |
| 9,366,879 | B1 | 6/2016 | Miller |
| 9,479,699 | B2 | 10/2016 | Brown et al. |
| 11,199,182 | B2 | 12/2021 | Miller et al. |
| 2002/0090749 | A1* | 7/2002 | Simmons ................ B81B 7/007 |
| | | | 257/254 |
| 2003/0006271 | A1 | 1/2003 | Chen et al. |
| 2004/0233581 | A1 | 11/2004 | Poorman |
| 2005/0093181 | A1 | 5/2005 | Brandenburg et al. |
| 2005/0206781 | A1 | 9/2005 | Sawada |
| 2005/0236708 | A1 | 10/2005 | Farnworth et al. |
| 2006/0017815 | A1 | 1/2006 | Stavely et al. |
| 2006/0018646 | A1 | 1/2006 | Stavely |
| 2006/0092514 | A1* | 5/2006 | Koo ...................... G02B 27/646 |
| | | | 359/557 |
| 2006/0150627 | A1 | 7/2006 | Oohara |
| 2006/0272328 | A1* | 12/2006 | Hara ...................... H04N 23/54 |
| | | | 60/527 |
| 2007/0279497 | A1 | 12/2007 | Wada et al. |
| 2008/0198249 | A1 | 8/2008 | Tanimura et al. |
| 2008/0237840 | A1 | 10/2008 | Alcoe et al. |
| 2008/0239576 | A1 | 10/2008 | Higashi et al. |
| 2008/0247748 | A1 | 10/2008 | Tanimura et al. |
| 2009/0103194 | A1 | 4/2009 | Chen |
| 2009/0303360 | A1* | 12/2009 | Huang ................... H05K 1/189 |
| | | | 348/294 |
| 2010/0283887 | A1* | 11/2010 | Topliss ................... H04N 23/57 |
| | | | 60/527 |
| 2011/0120111 | A1 | 5/2011 | Alexander et al. |
| 2012/0043116 | A1 | 2/2012 | Kim et al. |
| 2012/0224075 | A1 | 9/2012 | Lim et al. |
| 2013/0182176 | A1 | 7/2013 | Honda |
| 2015/0135703 | A1 | 5/2015 | Eddington et al. |
| 2015/0304561 | A1 | 10/2015 | Howarth et al. |
| 2015/0346507 | A1 | 12/2015 | Howarth |
| 2015/0350500 | A1 | 12/2015 | Gutierrez et al. |
| 2016/0154251 | A1 | 6/2016 | Ladwig et al. |
| 2016/0227088 | A1 | 8/2016 | Brown et al. |
| 2016/0259177 | A1 | 9/2016 | Ladwig et al. |
| 2017/0080255 | A1 | 3/2017 | Law et al. |
| 2017/0118408 | A1 | 4/2017 | Gregory et al. |
| 2018/0171991 | A1 | 6/2018 | Miller et al. |
| 2021/0223563 | A1 | 7/2021 | Miller et al. |

FOREIGN PATENT DOCUMENTS

| | | |
|---|---|---|
| CN | 104204935 A | 12/2014 |
| EP | 1 153 774 A2 | 11/2001 |
| EP | 2 813 877 A1 | 12/2014 |
| JP | 11-337996 A | 12/1999 |
| JP | 2001-222379 A | 8/2001 |
| JP | 2006-31023 A | 2/2006 |
| JP | 2008-203402 A | 9/2008 |
| JP | 2010-268133 A | 11/2010 |
| JP | 2012-502323 A | 1/2012 |
| JP | 2015-518977 A | 7/2015 |
| JP | 2015-537247 A | 12/2015 |
| KR | 2012-0099945 A | 9/2012 |
| KR | 2015-0083250 A | 7/2015 |
| WO | WO 2010/089529 A1 | 8/2010 |
| WO | WO 2013/118601 A1 | 8/2013 |
| WO | WO 2013/121225 A1 | 8/2013 |
| WO | WO 2013/175197 A1 | 11/2013 |
| WO | WO 2014/083318 A1 | 6/2014 |
| WO | WO 2015/104908 A1 | 7/2015 |

OTHER PUBLICATIONS

International Preliminary Report on Patentability in International Application No. PCT/US2017/066864, mailed Jun. 27, 2019.
International Search Report and Written Opinion in International Application No. PCT/US2020/067584, mailed Mar. 23, 2021.
Partial Supplementary European Search Report in European Application No. 17879841.9, dated Jun. 19, 2020.
Extended European Search Report in European Application No. 17879841.9, dated Nov. 9, 2020.
Office Action in Chinese Patent Application No. 201780077472.9, dated Jul. 20, 2020.
Office Action in Chinese Patent Application No. 201780077472.9, dated Apr. 9, 2021.
Office Action in Chinese Patent Application No. 201780077472.9, dated Sep. 13, 2021.
Notice of Reasons for Refusal in Japanese Patent Application No. 2019-532062, dated Nov. 16, 2021.

(56) References Cited

OTHER PUBLICATIONS

Office Action in U.S. Appl. No. 15/844,296, dated Nov. 7, 2018.
Office Action in U.S. Appl. No. 15/844,296, dated Jun. 6, 2019.
Office Action in U.S. Appl. No. 15/844,296, dated Nov. 20, 2019.
Office Action in U.S. Appl. No. 15/844,296, dated Mar. 12, 2020.
Office Action in U.S. Appl. No. 15/844,296, dated Aug. 25, 2020.
Office Action in U.S. Appl. No. 15/844,296, dated Feb. 22, 2021.
Notice of Allowance in U.S. Appl. No. 15/844,296, dated Jul. 30, 2021.
Office Action in U.S. Appl. No. 17/137,278, dated Jun. 17, 2021.
Office Action in U.S. Appl. No. 17/137,278, dated Sep. 30, 2021.
Office Action in Chinese Patent Application No. 201780077472.9, dated Mar. 1, 2022.
Notice of Preliminary Rejection in Korean Patent Application No. 10-2019-7019987, dated Apr. 13, 2022.
Office Action in U.S. Appl. No. 17/137,278, dated Apr. 15, 2022.
International Preliminary Report on Patentability in International Application No. PCT/US2020/067584, mailed Jul. 21, 2022.
Examination Report in European Application No. 17879841.9, dated Sep. 5, 2022.
Notice of Granting Patent Right for Invention in Chinese Patent Application No. 201780077472.9, dated Aug. 12, 2022.
Office Action in U.S. Appl. No. 17/137,278, dated Sep. 6, 2022.
Notice of Reasons for Refusal in Japanese Patent Application No. 2019-532062, dated Sep. 20, 2022.
Notice of Allowance in Korean Patent Application No. 10-2019-7019987, dated Dec. 19, 2022.
Notice of Allowance in U.S. Appl. No. 17/137,278, dated Oct. 25, 2022.
Notice of Decision of Refusal in Japanese Patent Application No. 2019-532062, dated Jan. 24, 2023.
Office Action in U.S. Appl. No. 17/137,278, dated Mar. 3, 2023.
Examination Report in United Kingdom Application No. 2209876.8, dated Jun. 5, 2023.
Office Action in U.S. Appl. No. 17/137,278, dated Jun. 29, 2023.
Notice of Preliminary Rejection in Korean Patent Application No. 10-2023-7007611, dated Nov. 8, 2023.
Office Action in U.S. Appl. No. 17/137,278, dated Nov. 28, 2023.
Office Action in U.S. Appl. No. 17/137,278, dated Mar. 7, 2024.

* cited by examiner

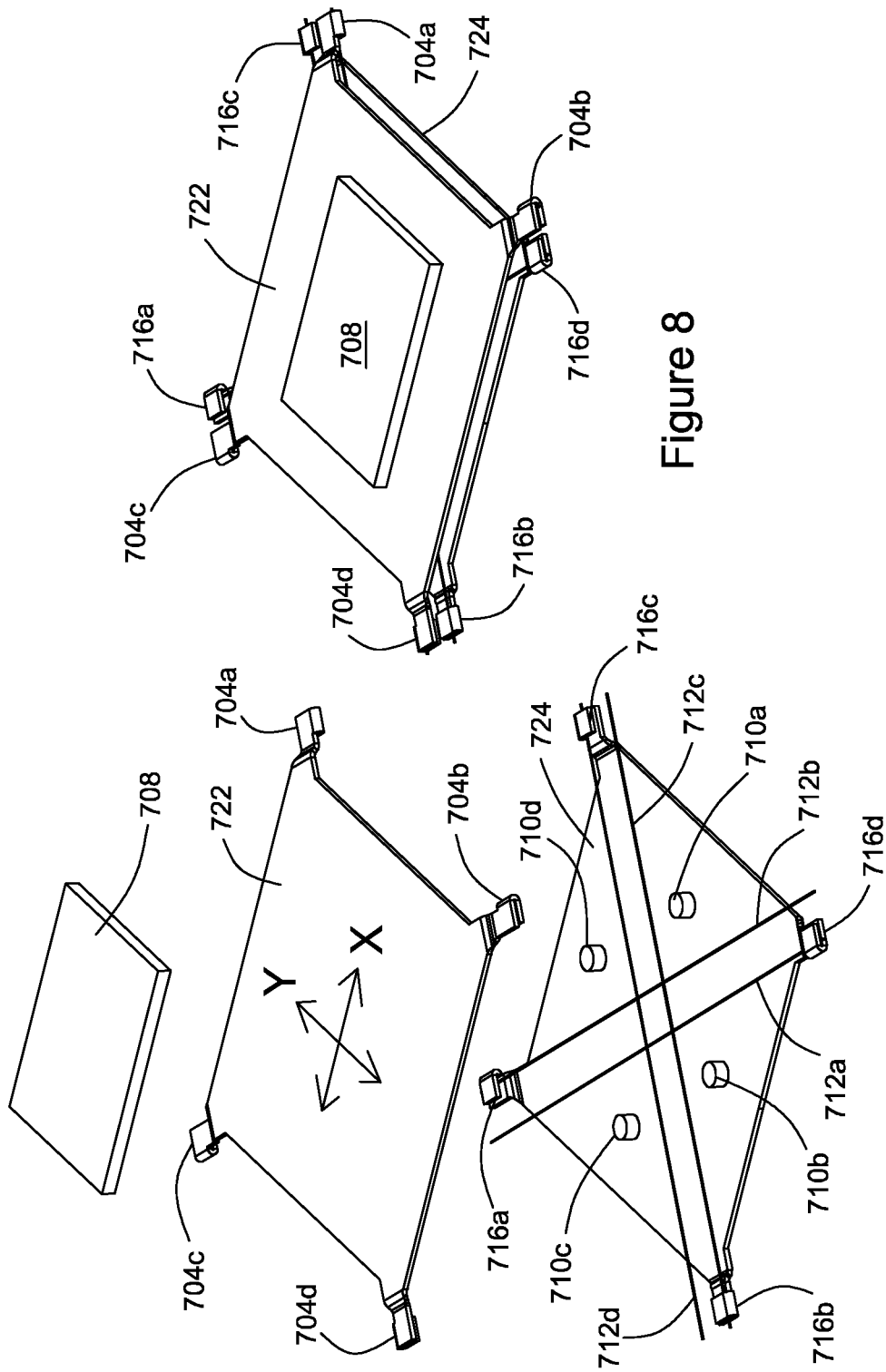

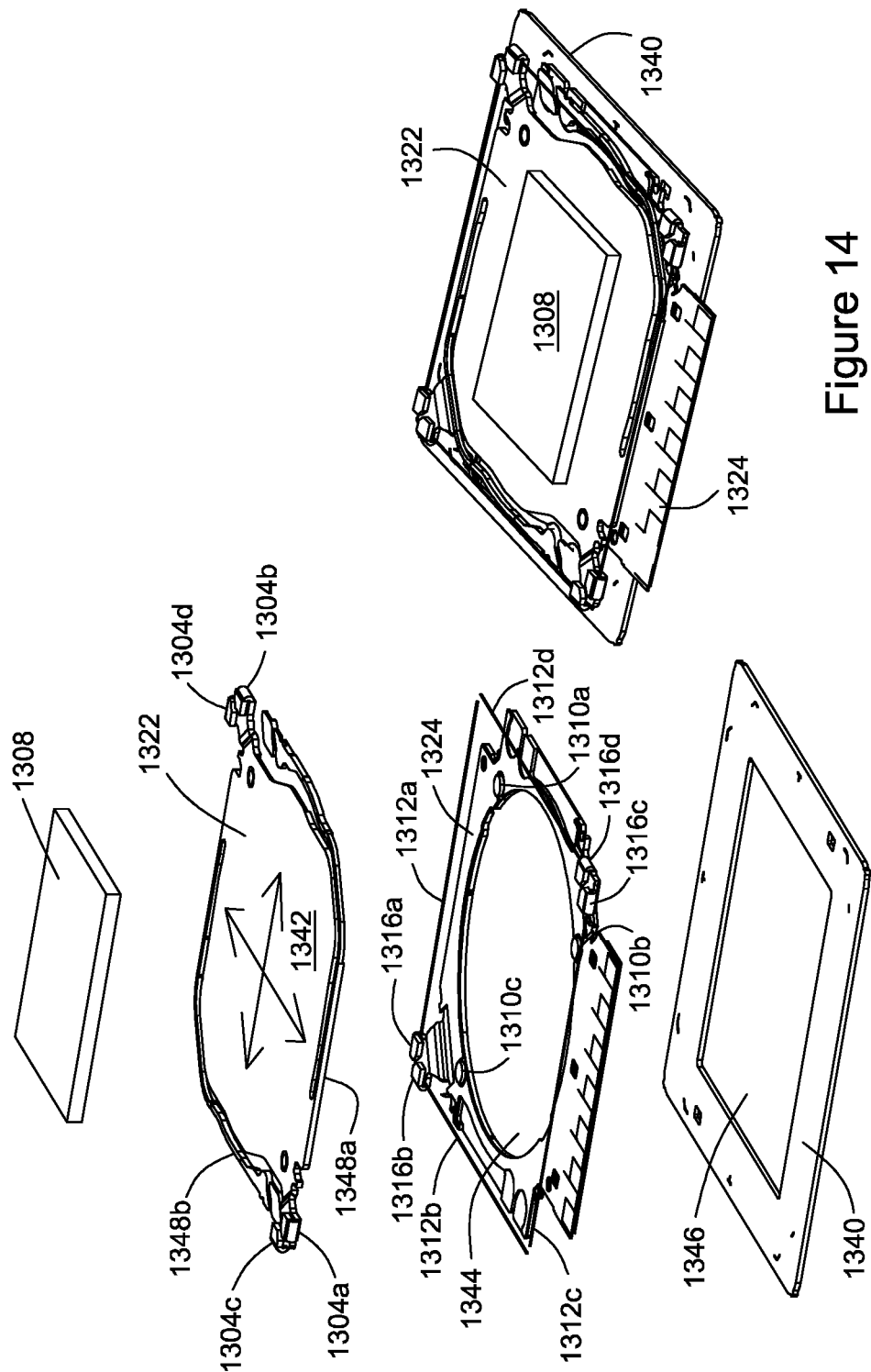

SMA OIS SPRING SHOWN IN THE FLAT STATE

SPRING ARM WORKING LENGTH

WIDE SPRING ARMS FORMED AT 90 DEGREES MAKES ROOM FOR MANY TRACES TO TRANSITION FROM MOVING PLATE TO THE STATIC PLATE.

SHOWN IN THE FLAT STATE

4 SIDED VERSION

MOVING PLATE

1 SIDED VERSION

FEET OR PADS CONNECT TO STATIC CIRCUIT BELOW

PADS HOOK TO IMAGE SENSOR

FLEXIBLE BENT CIRCUIT LOW X/Y STIFFNESS

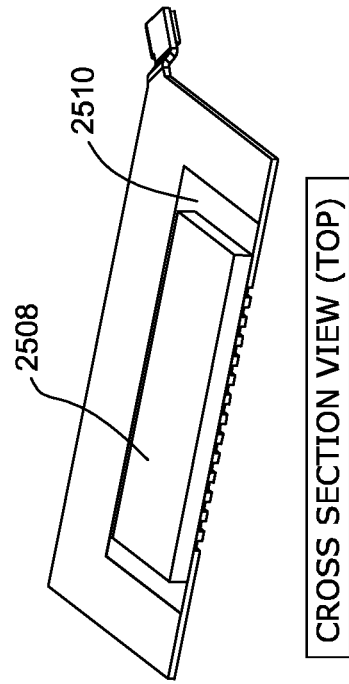
Figure 28
CROSS SECTION VIEW (TOP)
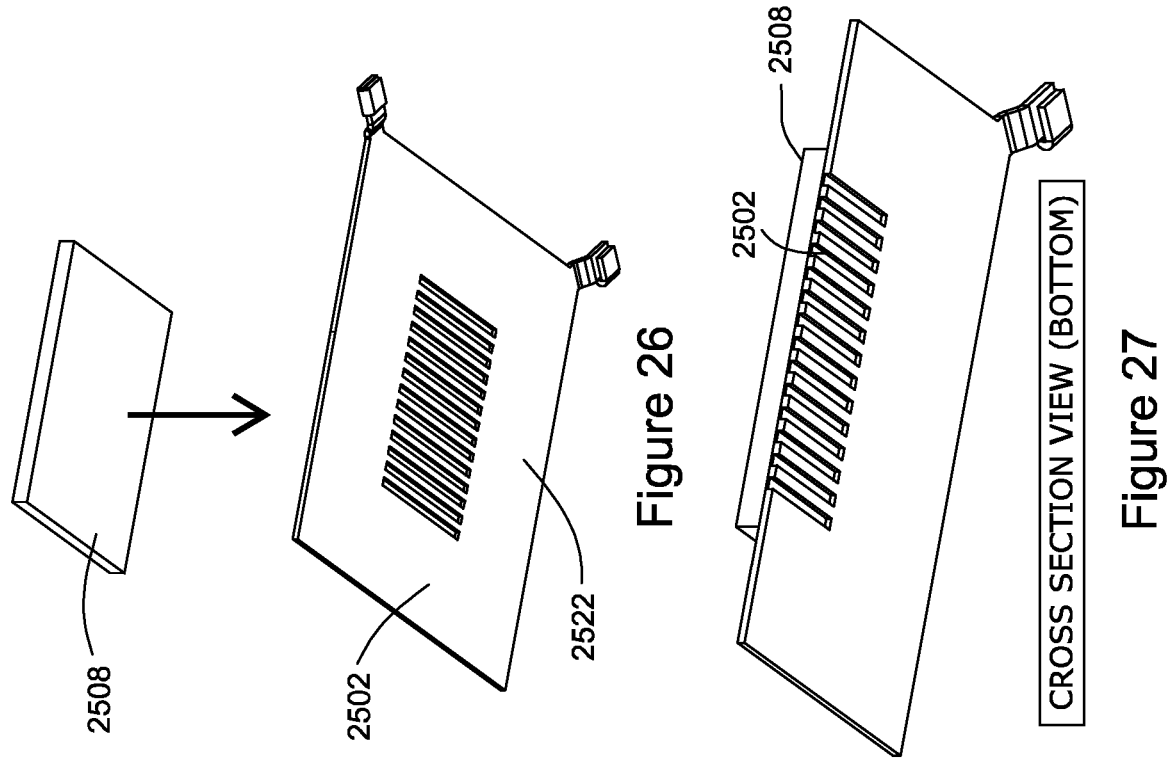
Figure 26
Figure 27
CROSS SECTION VIEW (BOTTOM)

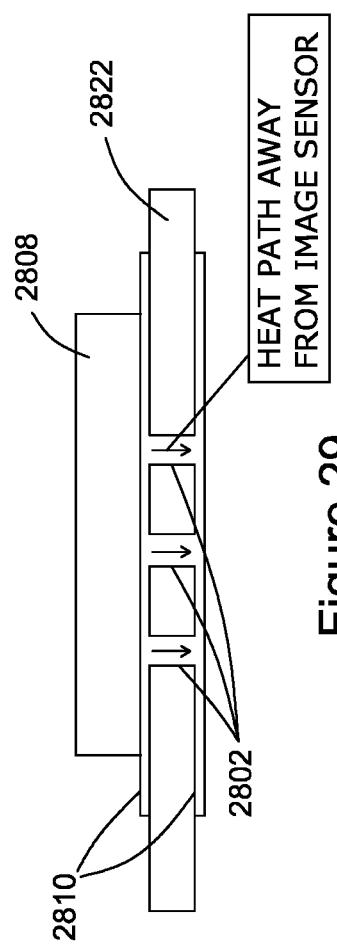

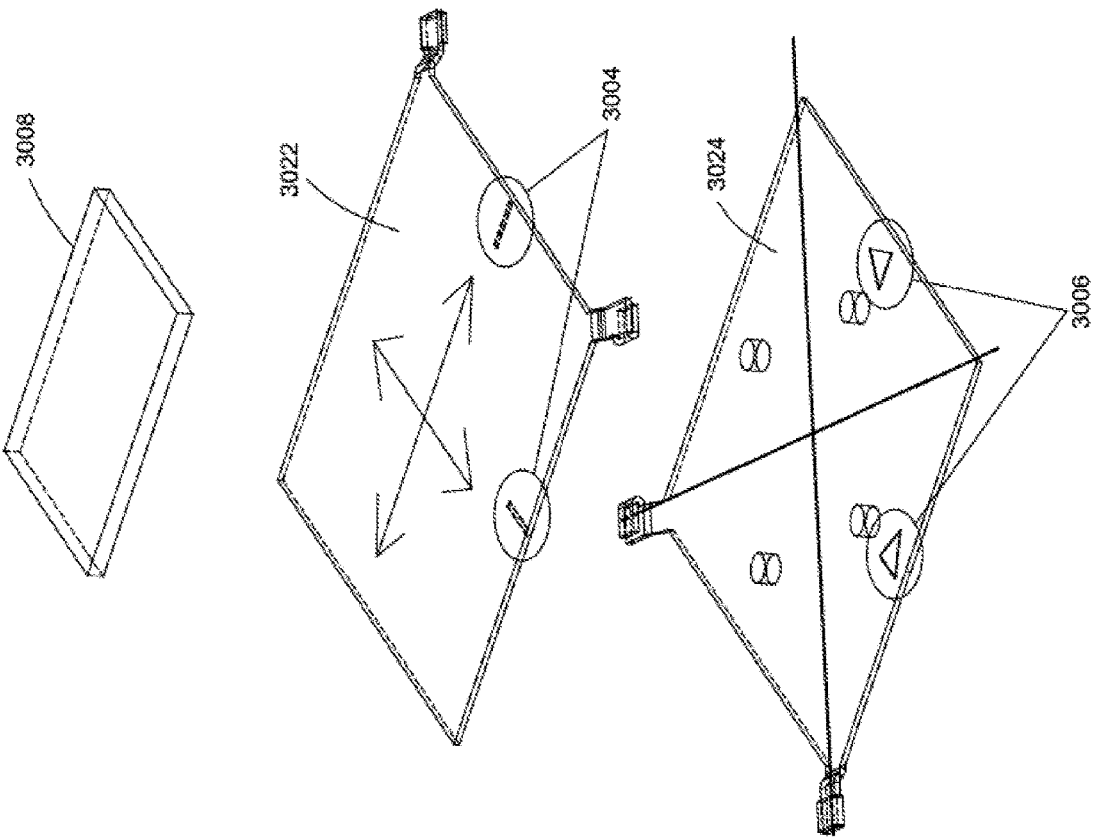
Figure 31
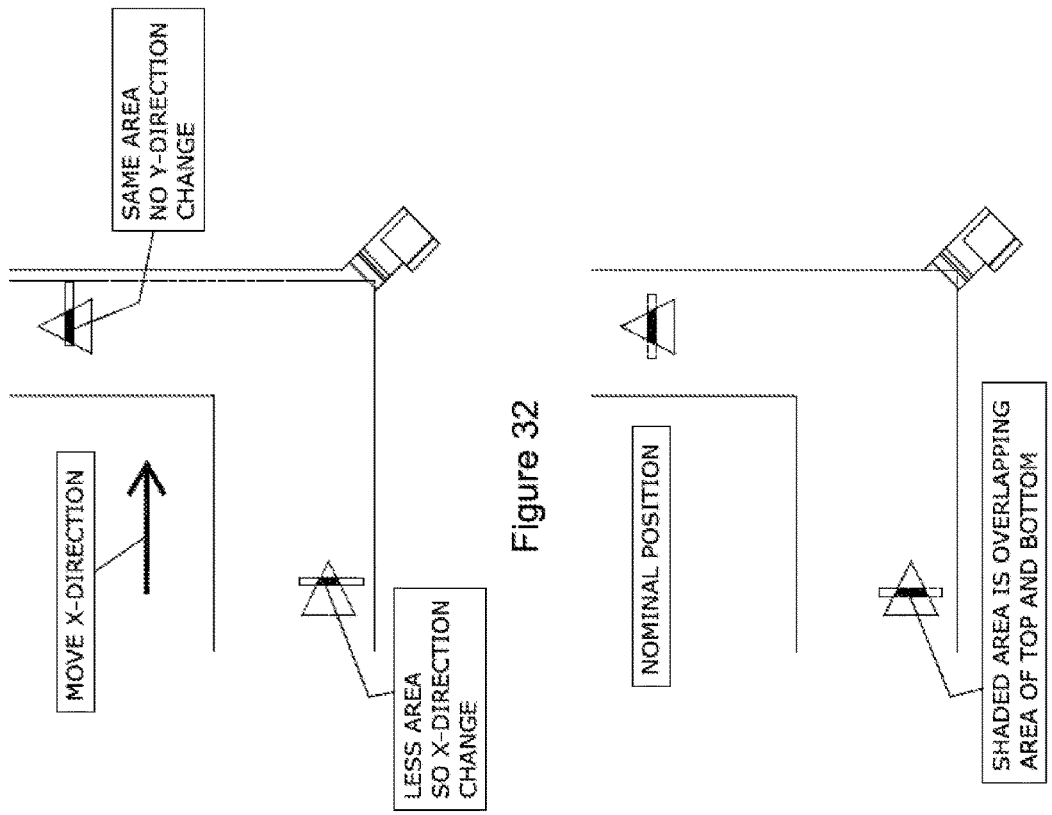
Figure 32
Figure 33

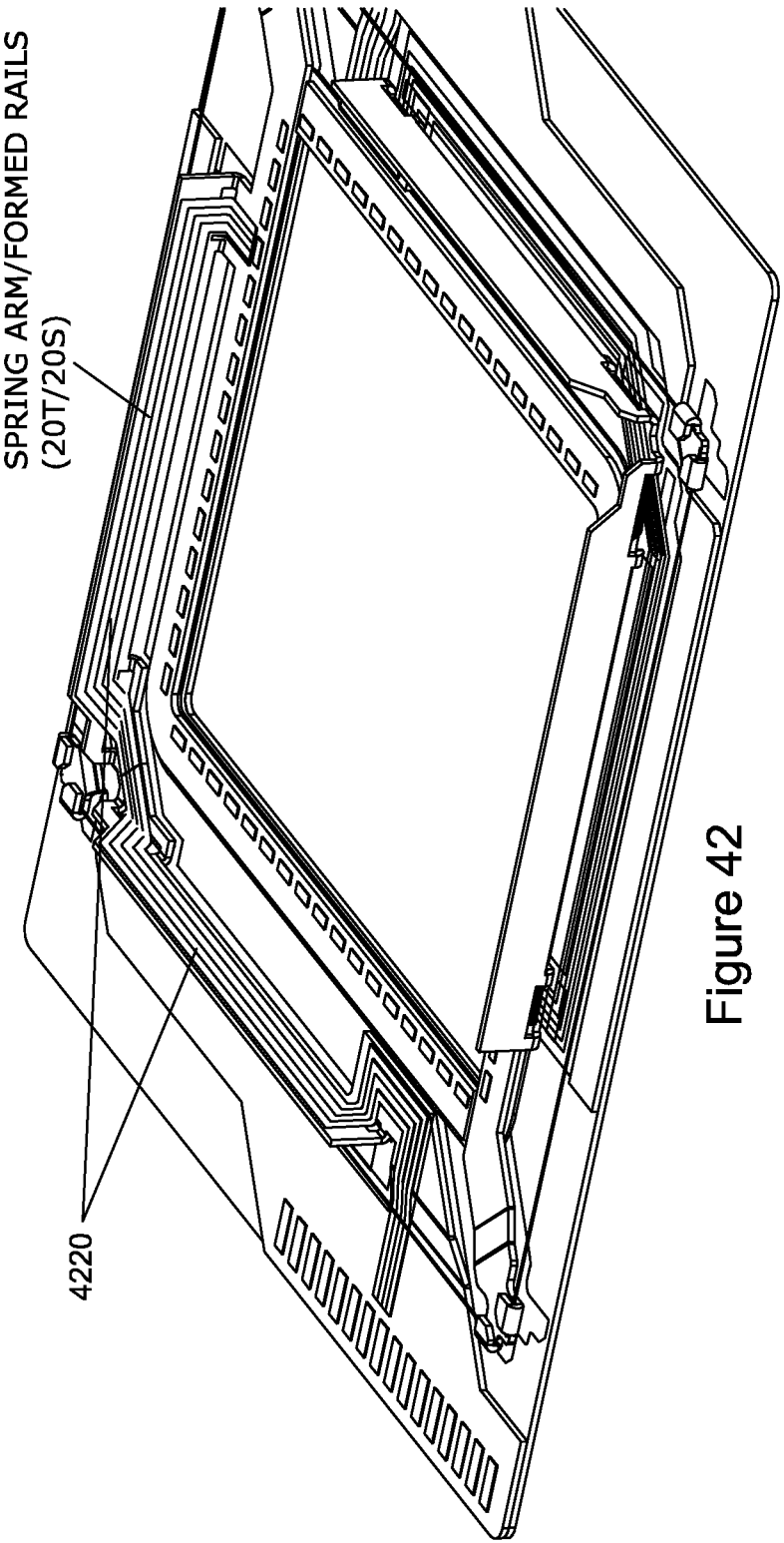
Figure 42
Figure 43

SENSOR SHIFT STRUCTURES IN OPTICAL IMAGE STABILIZATION SUSPENSIONS

CROSS-REFERENCE TO RELATED APPLICATIONS

This application is a Continuation of U.S. patent application Ser. No. 15/844,296, filed Dec. 15, 2017, which claims priority from U.S. Provisional Patent Application No. 62/435,231, filed on Dec. 16, 2016, which is hereby incorporated by reference in its entirety.

FIELD

The invention relates generally to optical image stabilization (OIS) suspensions used in connection with cameras, including those incorporated into mobile devices such as phones and tablets.

BACKGROUND

Shape memory alloy ("SMA") camera lens optical image stabilization ("OIS") suspensions are generally known and disclosed, for example, in the Howarth U.S. Pat. No. 9,175,671, Miller U.S. Pat. No. 9,366,879, and Brown U.S. Pat. No. 9,479,699, the Ladwig U.S. Patent Application Publication 2016/0154251, Eddington U.S. Patent Application Publication 2015/0135703, and Howarth U.S. Patent Application Publication 2015/0346507, and the PCT International Application Publication Nos. WO 2014/083318 and WO 2013/175197, all of which are incorporated herein by reference in their entireties and for all purposes. Embodiments include a moving member mounted to a support member. A base can be mounted to the side of the support member opposite the moving member. OIS assemblies of these types have an image sensor mounted to the base or support member and a lens holder with an auto focus ("AF") assembly or mechanism mounted to the moving member. SMA wires couple the moving member to the support member and are controlled by a controller. The SMA wires are driven to move the moving member about x-y axes with respect to the support member to stabilize the position of the image produced by the lens on the sensor against vibrations such as those that might be caused by movement of the user's hands.

There remains, however, a continuing need for improved OIS suspensions. OIS suspensions of these types that are highly functional, robust and efficient to manufacture would be particularly desirable.

SUMMARY

A suspension assembly is described. The suspension assembly including a static member or plate; a moving member or plate movable about an x-axis and a y-axis with respect to the static plate; a sensor mounting region on the moving plate; and
one or more shape memory alloy (SMA) elements extending between and coupled to the static plate and moving plate. The SMA elements, when driven by a controller, move the moving plate and the sensor mounting region thereon about the x-axis and the y-axis with respect to the static plate.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which:

FIG. 7 illustrates an exploded view of an optical image stabilization suspension assembly including 4 SMA wires according to an embodiment;

FIG. 8 illustrates a perspective view of the optical image stabilization suspension assembly illustrated in FIG. 7;

FIG. 13 illustrates optical image stabilization suspension assembly implemented as a square wire sensor assembly according to an embodiment;

FIG. 14 illustrates a perspective view of the optical image stabilization suspension assembly illustrated in FIG. 13;

FIG. 26 illustrates a bottom side of a moving member including heat sink features of an optical image stabilization suspension assembly according to an embodiment;

FIG. 27 illustrates a cross sectional view from the bottom of a moving member including heat sink features of an optical image stabilization suspension assembly according to an embodiment;

FIG. 28 illustrates a cross sectional view from the top of a moving member including heat sink features and conductive plating of an optical image stabilization suspension assembly according to an embodiment;

FIG. 29 illustrates a moving member of an optical image stabilization suspension assembly according to an embodiment including vias and conductive plating;

FIG. 31 illustrates an exploded view of an optical image stabilization suspension assembly according to an embodiment including one or more capacitance probes as a movement sensor;

FIG. 32 illustrates an example of determining movement using a capacitance probe according to an embodiment;

FIG. 33 illustrates an example of determining a nominal or center position of an optical image stabilization suspension assembly according to an embodiment;

FIG. 42 illustrates a perspective view of an optical image stabilization suspension assembly implemented as an integrated SMA actuator assembly according to an embodiment;

FIG. 43 illustrates a side view of an optical image stabilization suspension assembly implemented as an integrated SMA actuator assembly according to an embodiment.

DETAILED DESCRIPTION

Figure 1:
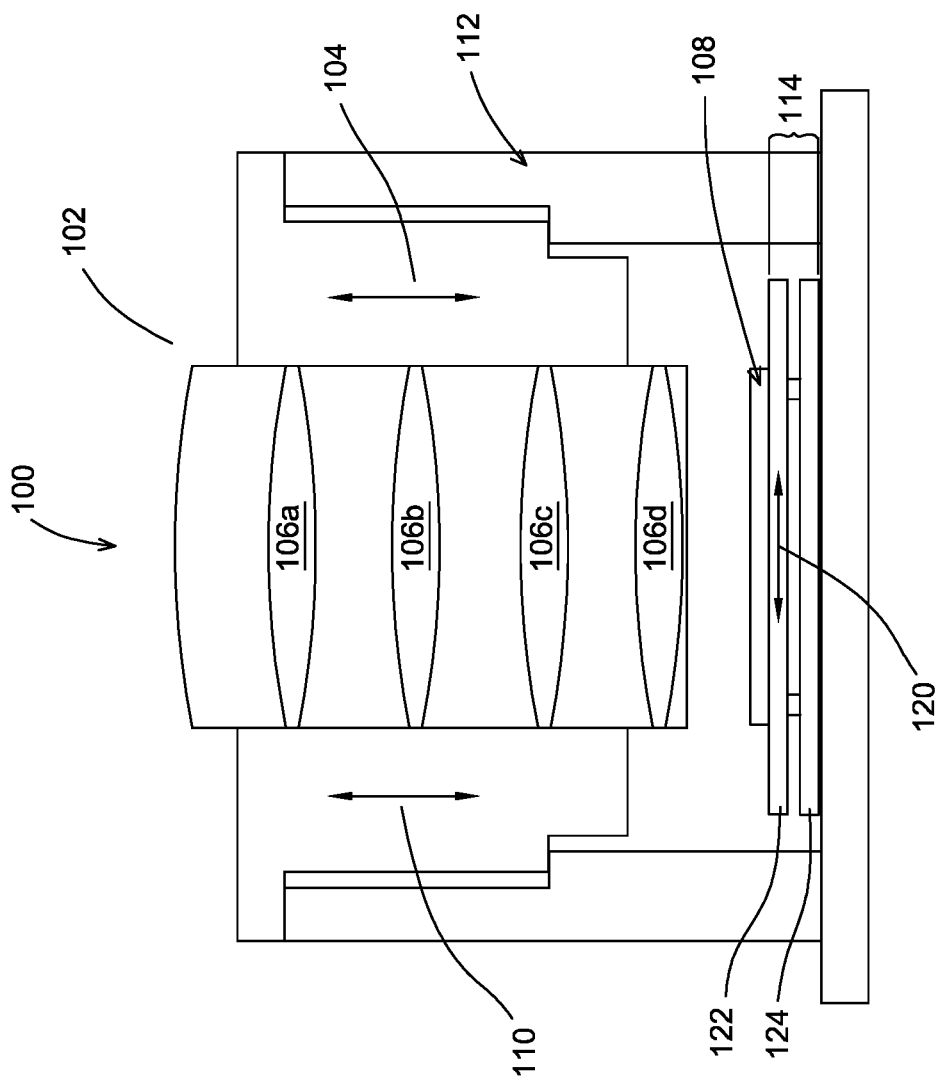
FIG. 1 illustrates a sensor shift camera system including an optical image stabilization suspension according to an embodiment.

Embodiments of the invention include optical image stabilization (OIS) suspensions having a static or support member or plate, a moving member or plate, and one or more shape memory alloy (SMA) elements or wires extending between the static and moving plates. An image sensor is mounted to the moving plate. Lens components such as a lens holder and optionally an auto focus (AF) assembly are fixedly mounted to or with respect to the static plate. The SMA wires can be driven by a controller to move the moving plate and image sensor thereon about x-y axes with respect to the static plate and lens components, and stabilize the position of the lens components and the image produced thereby on the sensor. The OIS suspension can thereby compensate for vibrations such as those that might be caused by movement of the user's hands. Suspensions of these types can be miniaturized, and used, for example, with camera lens and imaging systems incorporated into mobile phones, tablets and other devices.

Embodiments of the invention are described in the attached document entitled SMA OIS Sensor Shift Components, which is incorporated herein by reference in its entirety and for all purposes. Processes and structures of the type described in the patents identified above in the background section can be used in connection with these embodiments. Conventional additive deposition and/or subtractive processes such as wet (e.g., chemical) and dry (e.g., plasma) etching, electro plating and electroless plating and sputtering processes in connection with photolithography (e.g., use of patterned and/or unpatterned photoresist masks), as well as mechanical forming methods (e.g., using punches and forms) can be used to manufacture the OIS suspension components in accordance with embodiments of the invention. Additive and subtractive processes of these types are, for example, known and used in connection with the manufacture of disk drive head suspensions, and are disclosed generally in the following U.S. patents, all of which are incorporated herein by reference for all purposes: Bennin et al. U.S. Pat. No. 8,941,951 entitled Head Suspension Flexure with Integrated Strain Sensor and Sputtered Traces, Bennin et al. U.S. Pat. No. 8,885,299 entitled Low Resistance Ground Joints for Dual Stage Actuation Disk Drive Suspensions, Rice et al. U.S. Pat. No. 8,169,746 entitled Integrated Lead Suspension with Multiple Trace Configurations, Hentges et al. U.S. Pat. No. 8,144,430 entitled Multi-Layer Ground Plane Structures for Integrated Lead Suspensions, Hentges et al. U.S. Pat. No. 7,929,252 entitled Multi-Layer Ground Plane Structures for Integrated Lead Suspensions, Swanson et al. U.S. Pat. No. 7,388,733 entitled Method for Making Noble Metal Conductive Leads for Suspension Assemblies, Peltoma et al. U.S. Pat. No. 7,384,531 entitled Plated Ground Features for Integrated Lead Suspensions, and Evans et al. U.S. Pat. No. 5,862,015 entitled Head Suspension with Resonance Feedback Transducer.

Although described in connection with certain embodiments, those of skill in the art will recognize that changes can be made in form and detail without departing from the spirit and scope of the invention. In particular, although features of embodiments are described individually or in connection with certain other features, features of the described embodiments can be combined with any or all features of other embodiments. By way of non-limiting examples, any or all embodiments of the described x/y flexible circuit/connector, thermal management and/or x/y position feedback concepts can be incorporated into or combined with any of the sensor shift mechanism concepts.

FIG. 1 illustrates a sensor shift camera system including an optical image stabilization suspension assembly according to an embodiment. The sensor shift camera system 100 includes a lens stack assembly 102 mounted in an autofocus assembly 104. The auto focus ("AF") assembly 104 includes one or more lenses 106a-d configured to focus an image on an image sensor 108 using techniques including those known in the art. The AF assembly 104 is mounted on a camera housing 112.

The AF assembly 104 may be a voice coil magnet actuator ("VCM") AF assembly or an SMA actuator AF assembly. A VCM AF assembly uses a voice coil magnet actuator to generate a motion in a direction perpendicular to a longitudinal axis of the image sensor 108, for example in the direction of the z-axis 110 of the sensor shift camera assembly 101, to move one or more of lenses 106a-d to focus an image on the image sensor 108 using techniques including those known in the art. An SMA actuator AF assembly uses SMA actuators to generate a motion in a direction perpendicular to a longitudinal axis of the image sensor 108, for example in the direction of the z-axis 110 of the sensor shift camera assembly 100, to move one or more of lenses 106a-d to focus an image on the image sensor 108 using techniques including those known in the art.

The image sensor 108 is attached to an optical image stabilization suspension assembly 114. The optical image stabilization suspension assembly 114 is configured to move the image sensor 118 in a plane parallel to a longitudinal axis of the image sensor 120, for example in directions of the x-axis and y-axis relative to the z-axis 110 of the sensor shift camera assembly 100. Shifting the image sensor 108 in the x and y directions relative to the static lens stack assembly 102 provides for the use of longer SMA wires since the optical image stabilization suspension assembly 114 does not have to make room of the image rays. The benefit of using longer SMA wires is that a longer stroke is achieved which provides the ability for the optical image stabilization suspension assembly 114 to compensate for greater movement.

The optical image stabilization suspension assembly 114, according to various embodiments, includes a static member 124, which can also be referred to as a static plate and a moving member 122, which can also be referred to as a moving plate. The moving member 122 is configured to receive the image sensor 108. For example, the image sensor 108 is attached to the moving member 122 at a sensor mounting region on the moving member 122. For some embodiments, the sensor mounting region is at or near the center of the moving member 122. For various embodiments, the image sensor 108 is attached to the moving member such that the image sensor 108 is between the moving member 122 and the static member 124 in order to reduce height of the optical image stabilization suspension assembly 114, which can reduce the overall height required for the sensor shift camera assembly 100.

Figure 2:
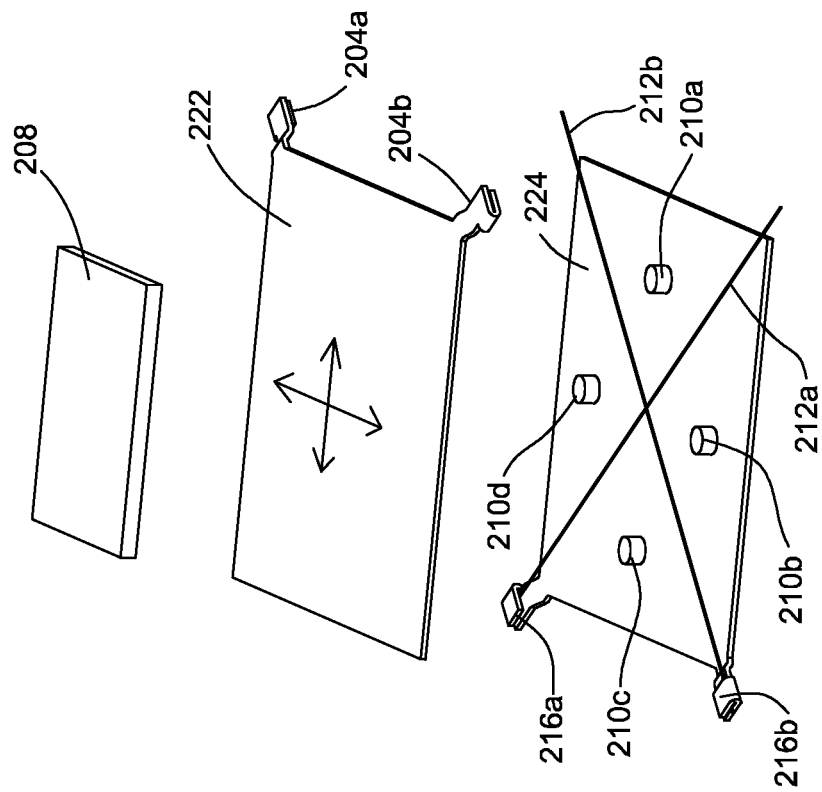
FIG. 2 illustrates an exploded view of an optical image stabilization suspension assembly according to an embodiment.

FIG. 2 illustrates an exploded view of an optical image stabilization suspension assembly according to an embodiment. The optical image stabilization suspension assembly 214 is configured to have an image sensor 208 disposed on and attached to moving member 222. The moving member 222 includes wire crimps 204a,b for attaching an SMA element such as SMA wires 212a,b to the moving member 222. The SMA wires 212a,b are located between the moving member 222 and the static member 224. The static member 224 includes wire crimps 216a,b for attaching SMA wires 212a,b to the static member 224. The static member 224, according to some embodiments, also includes one or more slide bearings 210a-d. Any number of slide bearings 210a-d may be used. Some embodiments include three slide bearings 210a-d. The slide bearings 210a-d can be made from a low friction material to enable relative sliding between the moving member 222 and the slide member 224. For some embodiments, the slide bearings 210a-d are ball bearings with features formed on static member 224 to contain the ball bearings.

Figure 3:
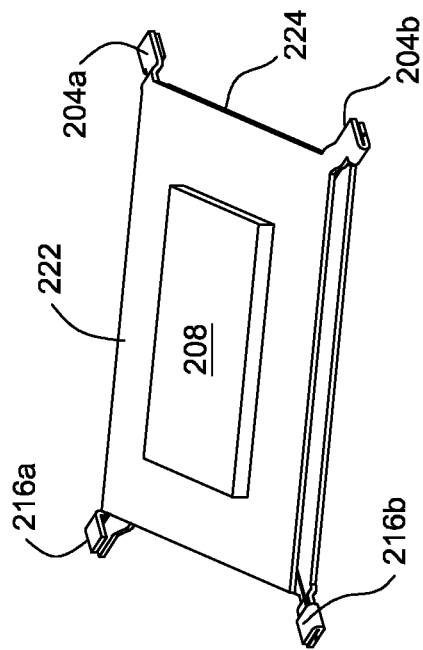
FIG. 3 illustrates a perspective view of the optical image stabilization suspension assembly illustrated in FIG. 2.

For various embodiments, any of the moving member wire crimps 204a,b and the static member wire crimps 216a,b can be offset from the respective moving member 222 and the static member 224 to put the SMA wires 212a,b at different heights in between the static member 224 and the moving member 222 so that the SMA wires 212a,b do not touch. For another embodiment centering springs are used to work against the pull force of the SMA wires 212a,b and are configured to hold the moving member 222 down on the slide bearings 210a-d. FIG. 3 illustrates a perspective view of the optical image stabilization suspension assembly illustrated in FIG. 2. When the SMA wires 212a,b are activated using techniques including those known in the art, movement of the moving member 222 in the directions of the x-axis and the y-axis is created. For some embodiments, different power is provided to each SMA wire 212a,b to move the moving member 222 in the directions of the x-axis and the y-axis.

Figure 4:
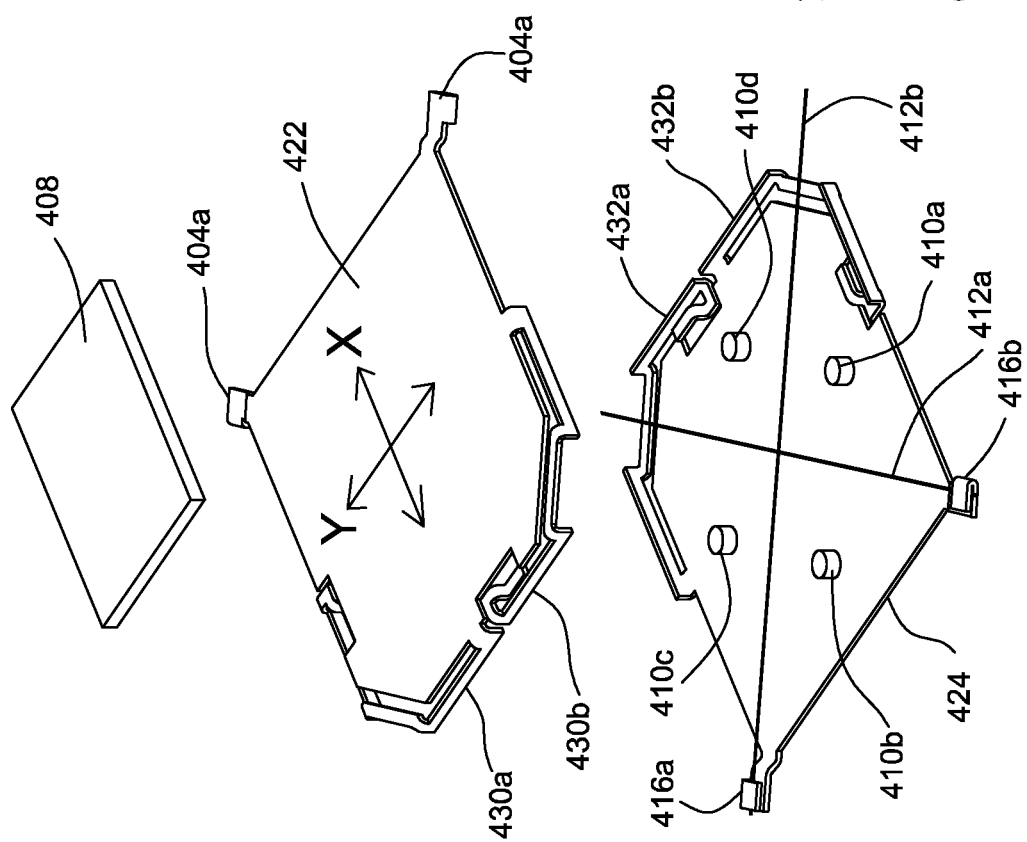
FIG. 4 illustrates an exploded view of an optical image stabilization suspension assembly including centering springs according to an embodiment.

FIG. 4 illustrates an exploded view of an optical image stabilization suspension assembly including centering springs according to an embodiment. The optical image stabilization suspension assembly is configured to have an image sensor 408 disposed on and attached to moving member 422. The moving member 422 includes wire crimps 404a,b for attaching SMA wires 412a,b to the moving member 422. The SMA wires 412a,b are located between the moving member 422 and the static member 424. The static member 424 includes wire crimps 416a,b for attaching SMA wires 412a,b to the static member 424. The static member 424, according to some embodiments, also includes one or more slide bearings 410a-d, such as described herein. For various embodiments, any of the moving member wire crimps 404a,b and the static member wire crimps 416a,b can be offset from the respective moving member 422 and the static member 424 to put the SMA wires 412a,b at different heights in between the static member 224 and the moving member 222 as described herein.

Figure 5:
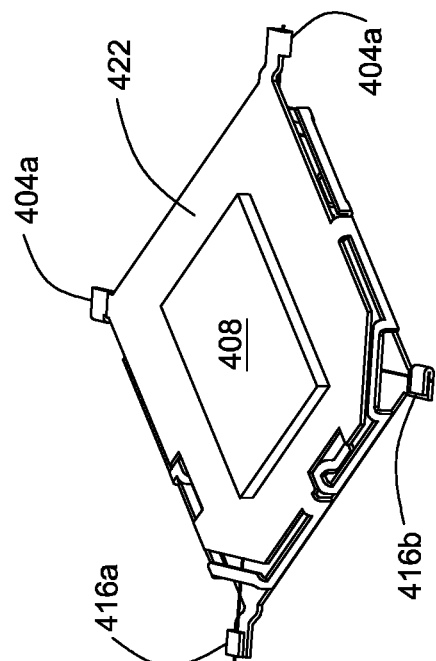
FIG. 5 illustrates a perspective view of the optical image stabilization suspension assembly illustrated in FIG. 4.

The moving member 422 includes centering springs 430a,b, for example a first centering spring 430a and a second centering spring 430b. Other embodiments include a moving member 422 including four centering springs. The static member 444 includes centering springs 432a,b, for example a first centering spring 432a and a second centering spring 432b. Other embodiments include a static member 422 including four centering springs. The centering springs 430a,b and 432a,b are used to work against the pull force of the SMA wires 412a,b and are configured to hold the moving member 422 down on the slide bearings 410a-d. FIG. 5 illustrates a perspective view of the optical image stabilization suspension assembly illustrated in FIG. 4. When the SMA wires 412a,b are activated using techniques including those known in the art, movement of the moving member 422 in the directions of the x-axis and the y-axis is created.

Figure 6:
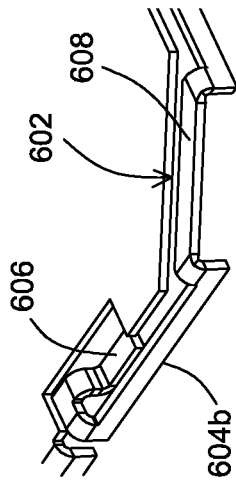
FIG. 6 illustrates a centering spring of an optical image stabilization suspension assembly according to an embodiment.

FIG. 6 illustrates a centering spring of an optical image stabilization suspension assembly according to an embodiment. The centering spring 602 includes a second formed spring arm 604a aligned with the second direction of movement of a member, such as in the y-axis. The centering spring 602 also includes a second formed spring arm 604b aligned with the second direction of movement of the member, such as in the y-axis. According to various embodiments, the first formed spring arm 604a and the second formed spring arm 608b are 90 degree formed spring arm, such that the longitudinal axis of the first formed spring arm 604a and the second formed spring arm 604b form a 90 degree angle. The spring arms are formed integral with and formed from the same material as one of the moving member or the static member. Forming the first formed spring arm 604a and the second formed spring arm 604b as 90 degree formed spring arms aids in lowering the stiffness of the springs. The first formed spring arm 604a and the second formed spring arm 604b are coupled with each other through a unformed corner section 608. The unformed corner section 608 is configured to provide clearance to the SMA wires attached to the wire crimps. The centering spring 602 also includes a spring foot 606. The spring foot 606 is formed to attach to the adjacent member. For example, the spring foot 606 of a formed spring arm of the moving member is attached to the static member and the spring foot 606 of a formed spring of the static member is attached to the moving member.

FIG. 7 illustrates an exploded view of an optical image stabilization suspension assembly including 4 SMA wires according to an embodiment. The optical image stabilization suspension assembly is configured to have an image sensor 708 disposed on and attached to moving member 722. The moving member 722 includes wire crimps 704a-d for attaching SMA wires 712a-d to the moving member 722. The SMA wires 712a-d are located between the moving member 722 and the static member 724. The static member 724 includes wire crimps 716a-d for attaching SMA wires 712a-d to the static member 724. The SMA wires 712a-d are configured to be oriented in a cross but offset parallel from each other and wire crimps are in each corner of each of the moving member 722 and the static member 724. Two parallel SMA wires running from a first corner to a second corner of the optical image stabilization suspension assembly and attached to the respective crimps, one to the static crimp and one to the moving crimp. Each wire of a pair is configured to provide opposing direction motion when activated. This removes the need to rely on centering springs to pull the optical image stabilization suspension assembly back to a center position. The SMA wires 712a-d are configured to pull against each other. A bias in pull force would cause the motion and if you want to move the optical image stabilization suspension assembly back to a center portion the activation bias of the SMA wire 712a-d is the changed to the inverse of the other. The static member 724, according to some embodiments, also includes one or more slide bearings 710a-d, such as described herein. For various embodiments, any of the moving member wire crimps 704a-d and the static member wire crimps 716a-d can be offset from the respective moving member 722 and the static member 724 to put the SMA wires 712a-d at different heights in between the static member 724 and the moving member 722 as described herein. FIG. 8 illustrates a perspective view of the optical image stabilization suspension assembly illustrated in FIG. 7. When the SMA wires 712a-d are activated using techniques including those known in the art, movement of the moving member 722 in the directions of the x-axis and the y-axis is created.

Figure 9:
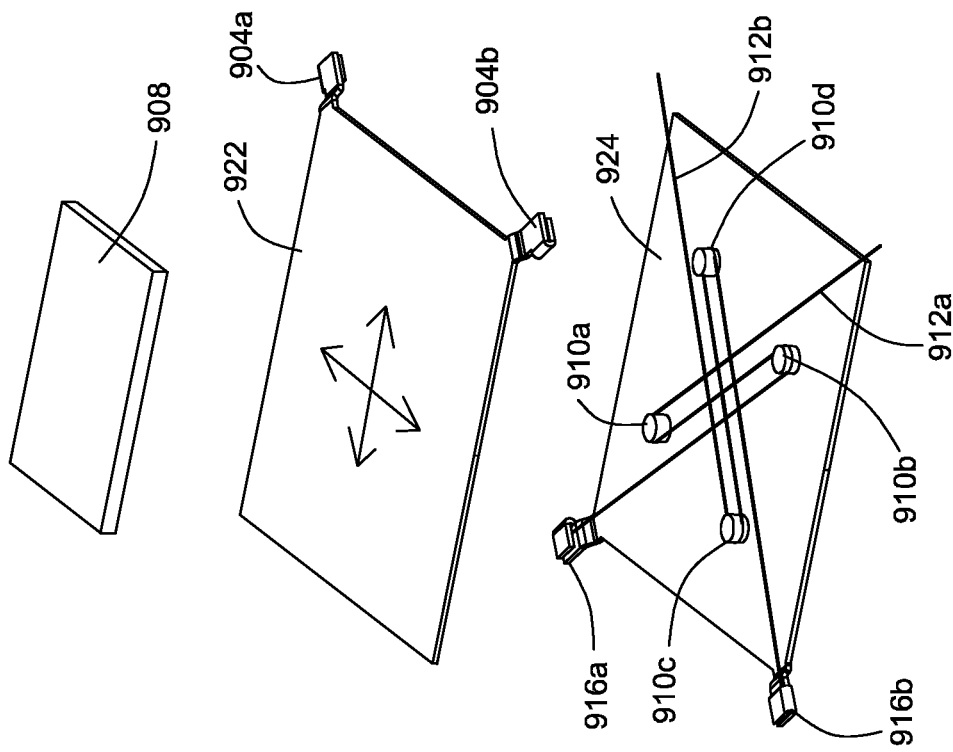
FIG. 9 illustrates an exploded view of an optical image stabilization suspension assembly including looped SMA wire according to an embodiment.

FIG. 9 illustrates an exploded view of an optical image stabilization suspension assembly including looped SMA wire according to an embodiment. The optical image stabilization suspension assembly is configured to have an image sensor 908 disposed on and attached to moving member 922. The moving member 922 includes wire crimps 904a,b for attaching SMA wires 912a,b to the moving member 922. The SMA wires 912a,b are located between the moving member 922 and the static member 924. The static member 924 includes wire crimps 916a,b for attaching SMA wires 912a,b to the static member 924. The static member 924, according to some embodiments, also includes one or more slide bearings 910a-d, such as described herein. According to various embodiments, each slide bearings 910a-d is configured with a pulley feature. For some embodiments, the pulley features are separate from one or more of the slide bearings 910a-d. The pulley features are configured to allow one or more SMA wires 912a,b wrapped around or engage a pulley feature, also referred to herein as a pin feature, to freely slide around the pulley features. The pulley features can be arranged in any configuration to generate movement in the moving plate 922. The pulley features separate from the slide bearings can be attached to a member using adhesive, welding, and other techniques known in the art.

Figure 10:
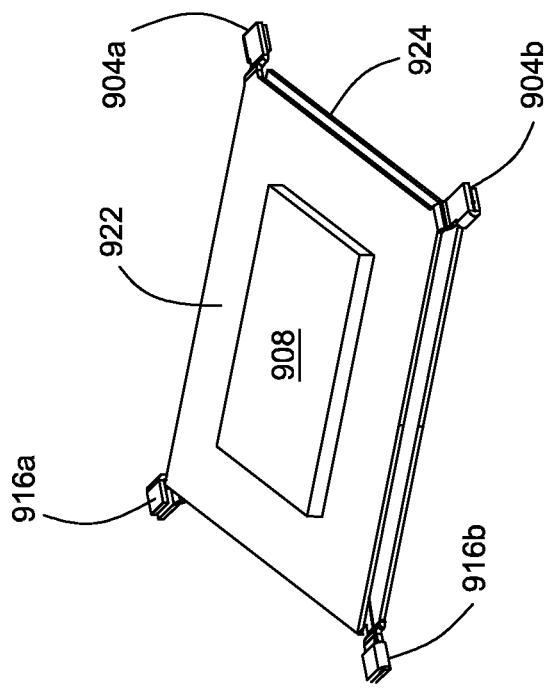
FIG. 10 illustrates a perspective view of the optical image stabilization suspension assembly illustrated in FIG. 9.

For various embodiments, any of the moving member wire crimps 904a,b and the static member wire crimps 916a,b can be offset from the respective moving member 922 and the static member 924 to put the SMA wires 912a,b at different heights in between the static member 924 and the moving member 922 as described herein. Other embodiments are configured with centering springs such as those described herein. Various embodiments may also include 4 SMA wires and 8 wire crimps such as those described herein. FIG. 10 illustrates a perspective view of the optical image stabilization suspension assembly illustrated in FIG. 9. When the SMA wires 912a,b are activated using techniques including those known in the art, movement of the moving member 922 in the directions of the x-axis and the y-axis is created.

Figures 11A, 11B:
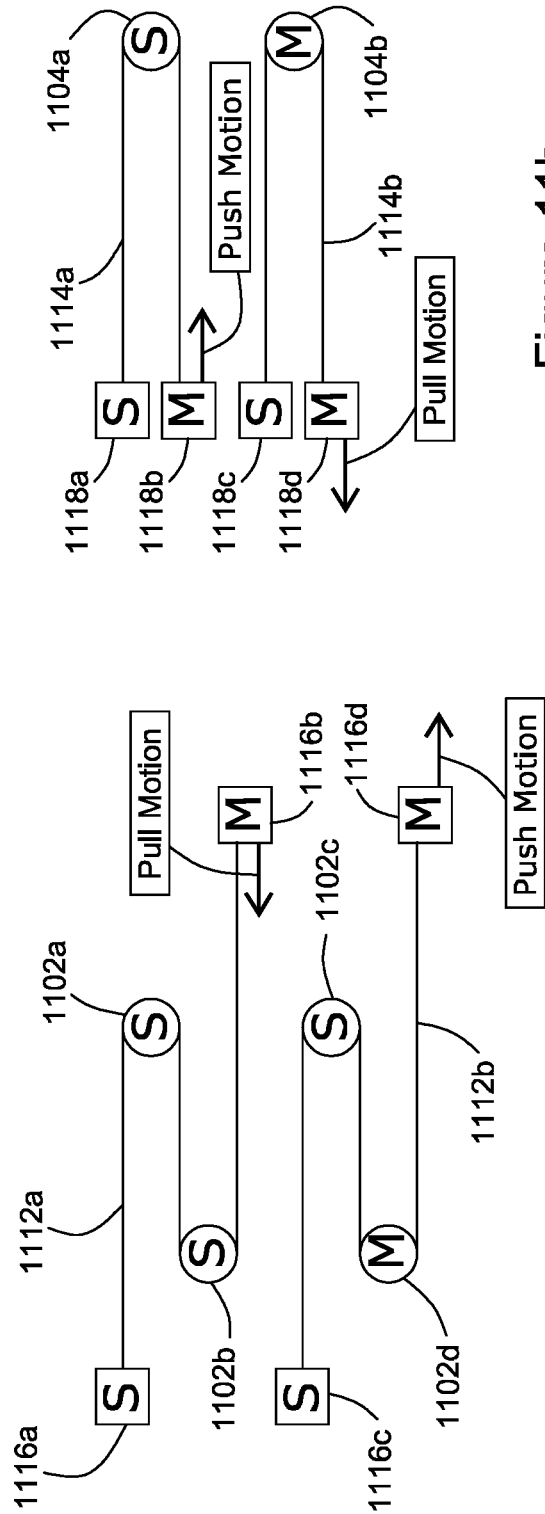
FIGS. 11a and b illustrate looped SMA wire configurations for optical image stabilization suspension assembly according to some embodiments.

FIGS. 11a and b illustrate looped SMA wire configurations for optical image stabilization suspension assembly according to some embodiments. FIG. 11a four pulley features 1102a-d with 2 SMA wires 1112a,b. A first end of a first SMA wire 1112a is attached to a first wire crimp 1116a on a static member, also referred to as a static crimp. The first SMA wire 1112a is wrapped around a first pulley feature 1102a on the static member and a second pulley feature 1102b on the static member (each of which are also referred to as a static pulley feature). The second end of the first SMA wire 1112a is attached to a second wire crimp 1116b on the moving member, also referred to as a moving crimp. This configuration results in a pull motion when the SMA wire 1112a is activated using techniques such as those known in the art including applying a voltage, a current, or heat to the SMA wire.

A first end of a second SMA wire 1112b is attached to a second wire crimp 1116c on the static member, also referred to as a static crimp. The second SMA wire 1112b is wrapped around a third pulley feature 1102c on the static member (also referred to as a static pulley feature) and a fourth pulley feature 1102d on the moving member (also referred to as a moving pulley feature). The second end of the second SMA wire 1112b is attached to a second wire crimp 1116d on the moving member, also referred to as a moving crimp. This configuration results in a push motion when the SMA wire 1112a is activated using techniques such as those known in the art including applying a voltage, a current, or heat to the SMA wire.

FIG. 11b illustrates a two pulley features 1104a,b with 2 SMA wires 1114a,b. A first end of a first SMA wire 1114a is attached to a first wire crimp 1118a on a static member, also referred to as a static crimp. The first SMA wire 1114a is wrapped around a first pulley feature 1104a on the static member (also referred to as a static pulley feature). The second end of the first SMA wire 1114a is attached to a second wire crimp 1118b on the moving member, also referred to as a moving crimp. This configuration results in a push motion when the SMA wire 1114a is activated using techniques such as those known in the art including applying a voltage, a current, or heat to the SMA wire.

A first end of a second SMA wire 1114b is attached to a second wire crimp 1118c on the static member, also referred to as a static crimp. The second SMA wire 1114b is wrapped around a second pulley feature 1104b on the moving member (also referred to as a moving pulley feature). The second end of the second SMA wire 1114b is attached to a second wire crimp 1118d on the moving member, also referred to as a moving crimp. This configuration results in a pull motion when the SMA wire 1114b is activated using techniques such as those known in the art including applying a voltage, a current, or heat to the SMA wire.

One or more of the SMA wire and pulley feature configurations illustrated in FIGS. 11a and b can be used optical image stabilization suspension assembly according to some embodiments to move a moving member in directions along the longitudinal axis and the latitudinal axis, for example in directions of an x-axis and a y-axis. Thus, an image sensor mounted to the moving member can be moved to offset any external force resulting in movement of a camera system that included the optical image stabilization suspension assembly.

Figure 12:
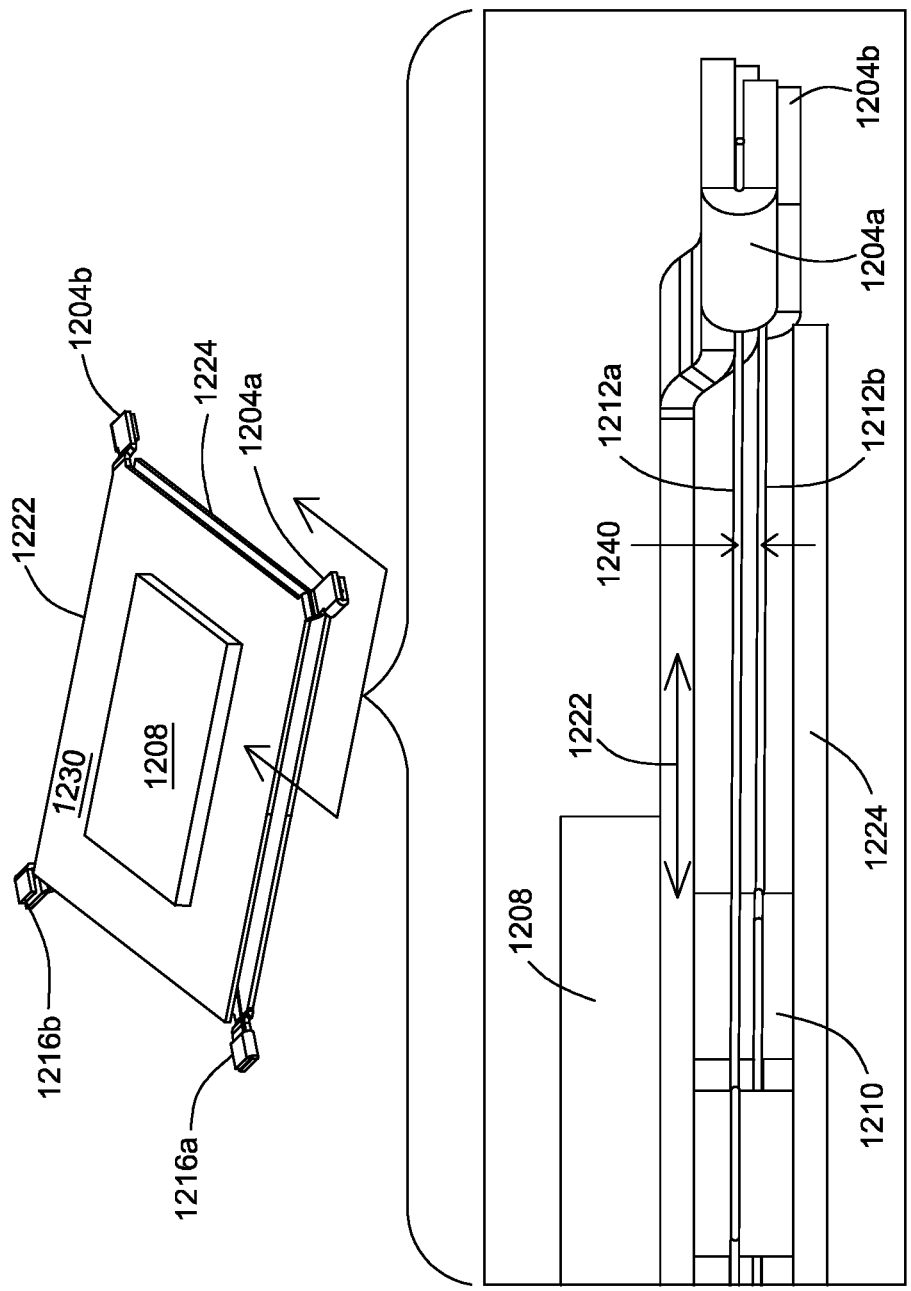
FIG. 12 illustrates a cross section of an optical image stabilization suspension assembly according to an embodiment.

FIG. 12 illustrates a cross section of an optical image stabilization suspension assembly according to an embodiment. The optical image stabilization suspension assembly is configured to have an image sensor disposed on and attached to moving member 1222. The moving member 1222 includes wire crimps 1204a,b for attaching SMA wires 1212a,b to the moving member 1222. The SMA wires 1212a,b are located between the moving member 1222 and the static member 1224. The static member 1224 includes wire crimps 1216a,b for attaching SMA wires 1212a,b to the static member 1224. The static member 1224, according to some embodiments, also includes one or more slide bearings 1210 as described herein. Any number of slide bearings 1210 may be used and any configuration.

As described herein, one or more of the moving member wire crimps 1204a,b and the static member wire crimps 1216a,b can be offset from either one of or both of the respective moving member 1222 and the static member 1224 to put the SMA wires 1212a,b at different heights or z-axis offsets in between the static member 1224 and the moving member 1222 so that the SMA wires 1212a,b do not touch. As illustrated in the cross section of FIG. 12, a first wire crimp 1204a on the moving member 1222 is formed to have an offset from the second wire crimp 1204b on the moving member 1222 in an axis perpendicular to the face 1230 of the moving member 1222, for example an offset in the direction of a z-axis. The offset in the wire crimps 1204a,b results in an wire offset 1240 of the SMA wires 1212a,b. This offset can be used to prevent SMA wires 1212a,b from interfering with each other during activation of one or both of the SMA wires 1212a,b.

FIG. 13 illustrates optical image stabilization suspension assembly implemented as a square wire sensor assembly according to an embodiment. The optical image stabilization suspension assembly is configured to have an image sensor 1308 disposed on and attached to moving member 1322. The moving member 1322 includes wire crimps 1304a-d for attaching SMA wires 1312a-d to the moving member 1322. The SMA wires 1312a-d are located between the moving member 1322 and the static member 1324. The static member 1324 includes wire crimps 1316a-d for attaching SMA wires 1312a-d to the static member 1324. The static member 1324, according to some embodiments, also includes one or more slide bearings 1310a-c. Any number of slide bearings 1310a-c may be used. Some embodiments include three slide bearings 1310a-c. The slide bearings 1310a-c can be made from a low friction material to better enable relative sliding between the moving member 1322 and the slide member 1324. For some embodiments, the slide bearings 1310a-c are ball bearings with features formed on static member 1324 to contain the ball bearings.

The square wire sensor assembly is configured to have, according to various embodiments, the four SMA wires 1312a-d mounted on the perimeter of the square wire sensor assembly. The four SMA wires 1312a-d pull against each other to return the moving member 1322 to a center position. Having the SMA wires 1312a-d mounted on the perimeter allows the moving member 1322 to sit closer to the static member 1324 than optical image stabilization suspension assemblies that have the SMA wires between the moving member and the static member. Thus, a thinner camera profile can be achieved. Further, for some embodiments the center portion 1342 of the moving member 1322 is configured to fit within a void 1344 within the static member 1324, also referred to as a z-height space (e.g., is in a recess or pocket in the moving member). Some embodiments of the square wire sensor assembly may include an optional base member 1340. For such embodiments, the center portion 1342 may be configured to fit within a void 1346 formed within the base member 1340.

The square wire sensor assembly, according to some embodiments, optionally include spring arms 1348a,b. Spring arms 1348a,b are formed on the moving member 1322 and are configured aid in the centering of the moving member 1322 and can also be configured to hold the moving member 1342 against the slide bearings 1310a-c. For example, the spring arms 1348a,b are configured to aid in moving the moving member to the center position of the square wire sensor assembly when the SMA wires 1312a-d are not activated. For an embodiment, the spring arms 1348a,b include a arcute portion and are configured to extend between the moving member 1342 and the static member 1344.

FIG. 14 illustrates a perspective view of the optical image stabilization suspension assembly illustrated in FIG. 13. When the SMA wires 1312a-d are activated using techniques including those known in the art, movement of the moving member 1322 in the directions of the x-axis and the y-axis is created. For some embodiments, a different power is provided to each parallel pair of SMA wire 212a-d to move the member 1322 in the directions of the x-axis and the y-axis.

Figure 15:
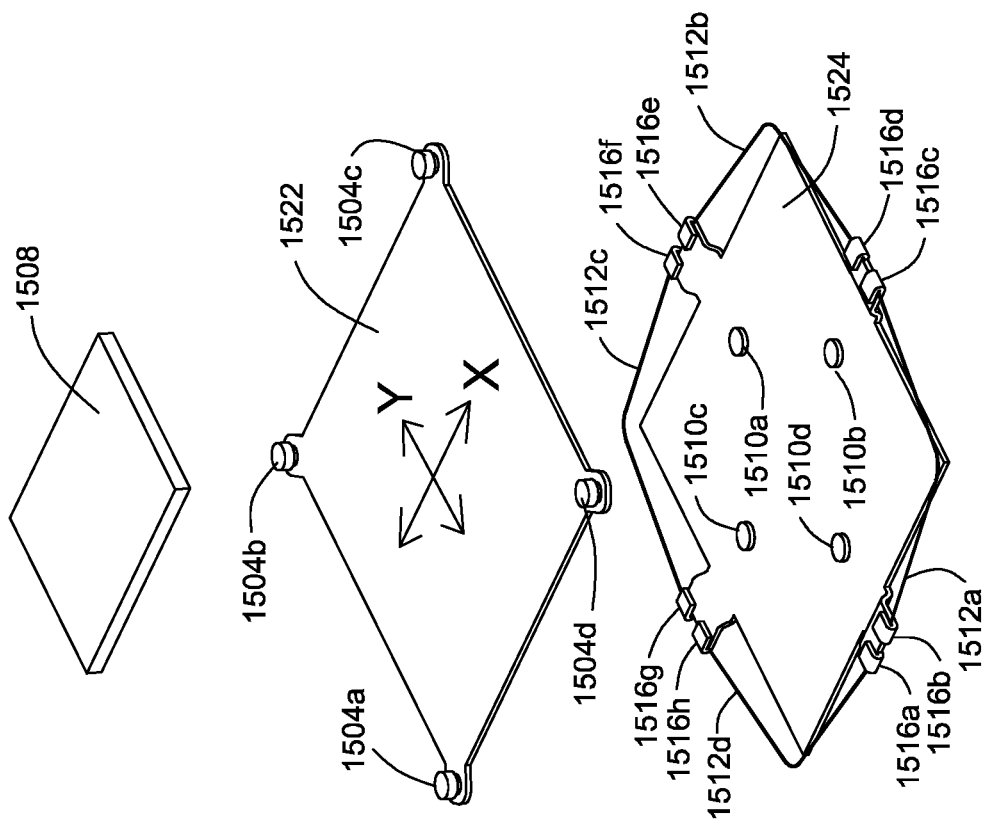
FIG. 15 illustrates optical image stabilization suspension assembly implemented as a bow style sensor assembly according to an embodiment.

FIG. 15 illustrates optical image stabilization suspension assembly implemented as a bow style sensor assembly according to an embodiment. The optical image stabilization suspension assembly is configured to have an image sensor 1508 disposed on and attached to moving member 1522. The moving member 1522 includes pin features 1504a-d, also referred herein as pulley features, located on the outside corners of the moving member 1522. The pin features 1504a-d are configured to have at least one of four SMA wires 1512a-d wrapped around a pin feature 1504 a-d. The SMA wires 1512a-d are located on the perimeter of the static member 1524. The static member 1524 includes eight wire crimps 1516a-h for attaching the four SMA wires 1512a-d between the wire crimps 1516a-h. The static member 1524, according to some embodiments, also includes one or more slide bearings 1510a-d. Any number of slide bearings 1510a-d may be used. Some embodiments include three slide bearings 1510a-d. The slide bearings 1510a-c can be made from a low friction material to better enable relative sliding between the moving member 1522 and the slide member 1524. For some embodiments, the slide bearings 1510a-d are ball bearings with features formed on static member 1524 to contain the ball bearings.

The bow style sensor assembly is configured to have, according to various embodiments, the four SMA wires 1512a-d mounted on the perimeter of the bow style sensor assembly. The four SMA wires 1512a-d pull against each other to return the moving member 1522 to a center position. Having the SMA wires 1512a-d mounted on the perimeter allows the moving member 1522 to sit closer to the static member 1524 than optical image stabilization suspension assemblies that have the SMA wires between the moving member and the static member. Thus, a thinner camera profile can be achieved.

Figure 16:
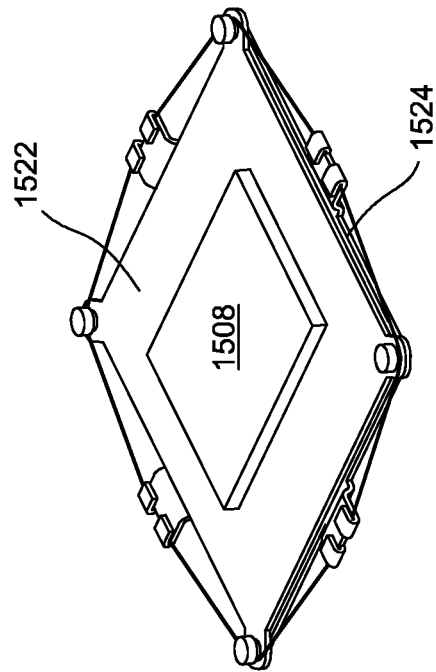
FIG. 16 illustrates a perspective view of the bow style sensor assembly illustrated in FIG. 15.

FIG. 16 illustrates a perspective view of the bow style sensor assembly illustrated in FIG. 15. When the SMA wires 1512a-d are activated using techniques including those known in the art, movement of the moving member 1522 in the directions of the x-axis and the y-axis is created. According to some embodiments, when an SMA wire 1512a-d is activated and contracts, the SMA wire 1512a-d applies a normal force to the pin feature it is wrapped around. Varied amounts of applied force between the 4 SMA wires 1512a-d acting on the respective pin feature 1504a-d the SMA wire is wrapped around is used to move the moving member 1522 in the directions of the x-axis and the y-axis. Having the SMA wires 1512a-d wrap around a respective pin feature 1504a-d increases the SMA wires 1512a-d length which increases the stroke. As the SMA wires 1512a-d shrinks in length when the wires are activated the moving plate will move an increased amount of distance because of the increase in the stroke.

Figure 17:
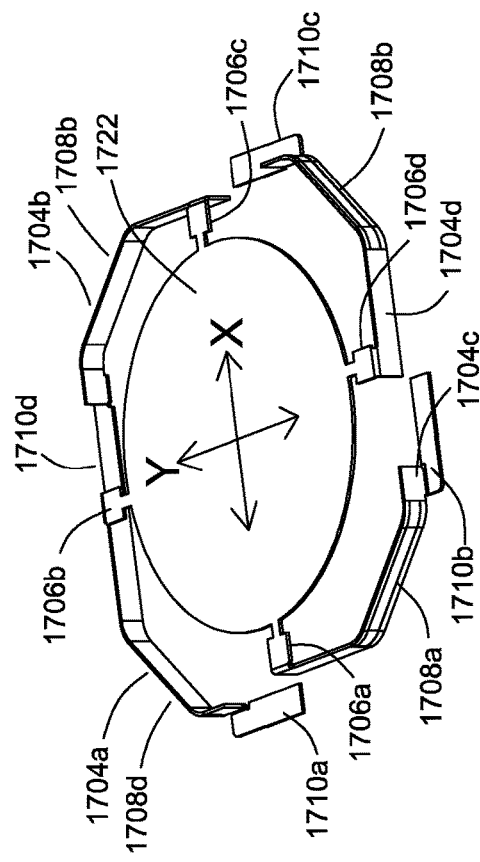
FIG. 17 illustrates optical image stabilization suspension assembly implemented as bimetallic actuator according to an embodiment.

FIG. 17 illustrates optical image stabilization suspension assembly implemented as bimetallic actuator according to an embodiment. The optical image stabilization suspension assembly is configured to have an image sensor disposed on and attached to moving member 1722. The moving member 1722 includes spring arms 1704a-d located on the outside of the moving member 1722. The spring arms 1704a-d, according to various embodiments, are coupled with the moving member 1722 through a respective strut 1706a-d. An SMA element such as SMA material 1708a-d is applied to each of the spring arms 1704a-d. The SMA material 1708a-d is attached to the spring arms 1704a-d using adhesive, solder, laser welding, resistance welding, and other techniques including those known in the art. For some embodiments that include spring arms 1704a-d formed of conductive material such as stainless steel, the SMA material 1708a-d is disposed on an insulation layer formed on the spring arms 1704a-d using techniques including those known in the art. For other embodiments, the SMA material can be electrically and structurally attached to the spring arm at only the ends of the SMA material and free in the center region of the SMA material from the spring arm. Being free in the center region provides the SMA material to pull straight during actuation while the spring arm will bend in an arc. The spring arm can contain an electrical circuit for driving power through the SMA material for actuation, also referred to as activation.

The SMA material 1708a-d can be applied to either side of a spring arm 1704a-d, that is, on the side of the spring arm 1704a-d facing towards the moving member 1722 or the face of the spring arm 1704a-d facing away from the moving member 1722. For some embodiments, SMA material 1708a-d is applied to both sides of a spring arm 1704a-d.

Figure 18:
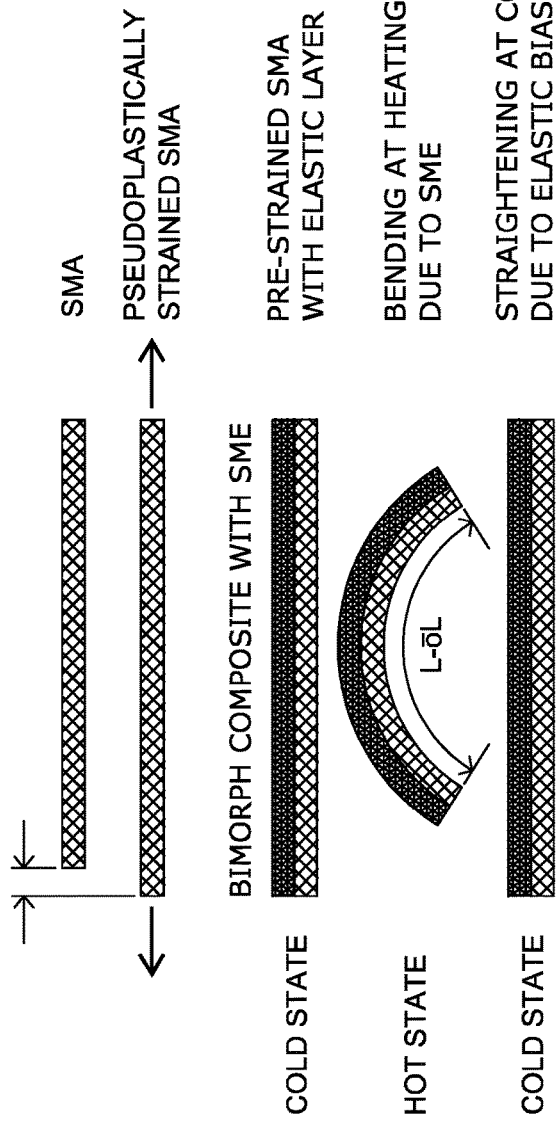
FIG. 18 illustrates exemplary movement of SMA material when the SMA material is heated and passes from a cold state to a hot state then back to a cold state.

The SMA material 1708a-d will bend the spring arm 1704a-d when heated resulting in movement of the moving member 1722 in the directions of the x-axis and y-axis. A controller can be used to apply coordinated power to the SMA material one or more of the spring arms 1704a-d to provide full motion in the x-axis and the y-axis of the moving member 1722. FIG. 18 illustrates exemplary movement of SMA material when the SMA material is heated and passes from a cold state to a hot state then back to a cold state using techniques known in the art. For example, the SMA material 1704a-d can be heated with an electrical current.

The spring arms 1704a-d also include static feet 1710a-d. The static feet 1710a-d are configured to attach to a static member such that the moving member 1722 moves relative to the static member when the SMA material 1704a-d is activated.

Figure 20:
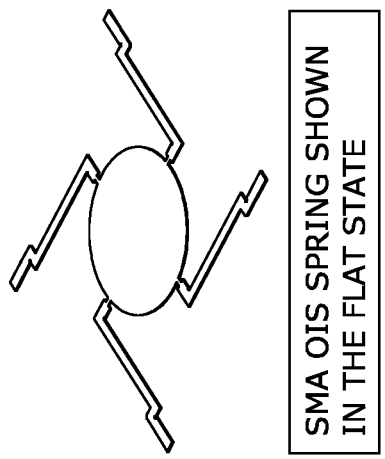
FIG. 20 illustrates a bimetallic actuator according to an embodiment in a flat, preformed state.
Figure 19:
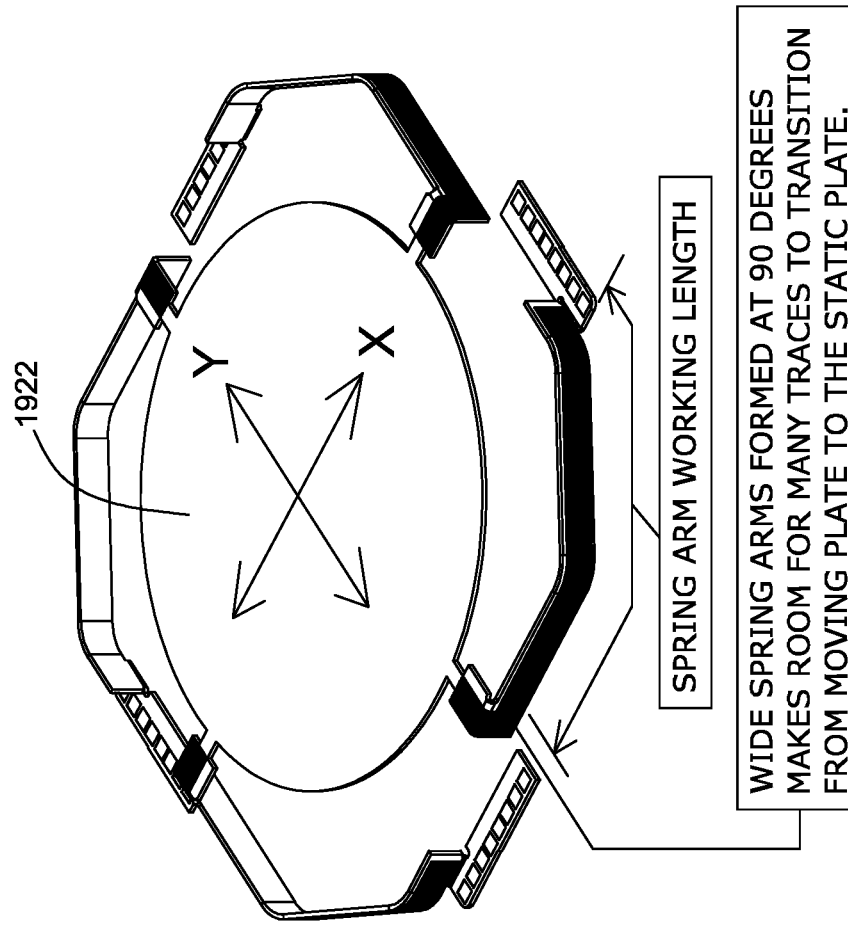
FIG. 19 illustrates an optical image stabilization suspension assembly implemented as bimetallic actuator according to an embodiment.

FIG. 19 illustrates an optical image stabilization suspension assembly implemented as bimetallic actuator according to an embodiment. Similar to the bimetallic actuator as described in reference to FIG. 17, the bimetallic actuator includes four spring arms that are formed at 90 degrees from one another. This reduces its stiffness in the direction of the x-axis and the y-axis for low resistance to movement in the direction of the x-axis and the y-axis and give a high stiffness in the direction of an axis perpendicular to the moving member 1922, the z-axis. For various embodiments, the spring arms are formed to be wide. This wide spring arm provides for many trances to be formed on top of the spring arms. Form some embodiments, each spring arm includes 8 traces and 8 static electrical pads at the end of each spring arm for a total of 32 traces. However, any number of traces and electrical pads may be formed on the spring arm traces. For some embodiments, the traces are routed toward the center of the moving member 1922 to connect to an image sensor. FIG. 19 illustrates spring arms a continuously formed 90 degree section. Other embodiments include spring arms formed of multiple sections of 90 degree formed sections separated by unformed sections along a working length of the spring arms. FIG. 20 illustrates a bimetallic actuator according to an embodiment in a flat, preformed state. The bimetallic actuator is similar to the bimetallic actuators described in reference to FIGS. 17 and 19. The final form of the bimetallic actuator is formed from the flat state to form bimetallic actuators such as those illustrated in FIGS. 17 and 19.

Figures 21, 22:
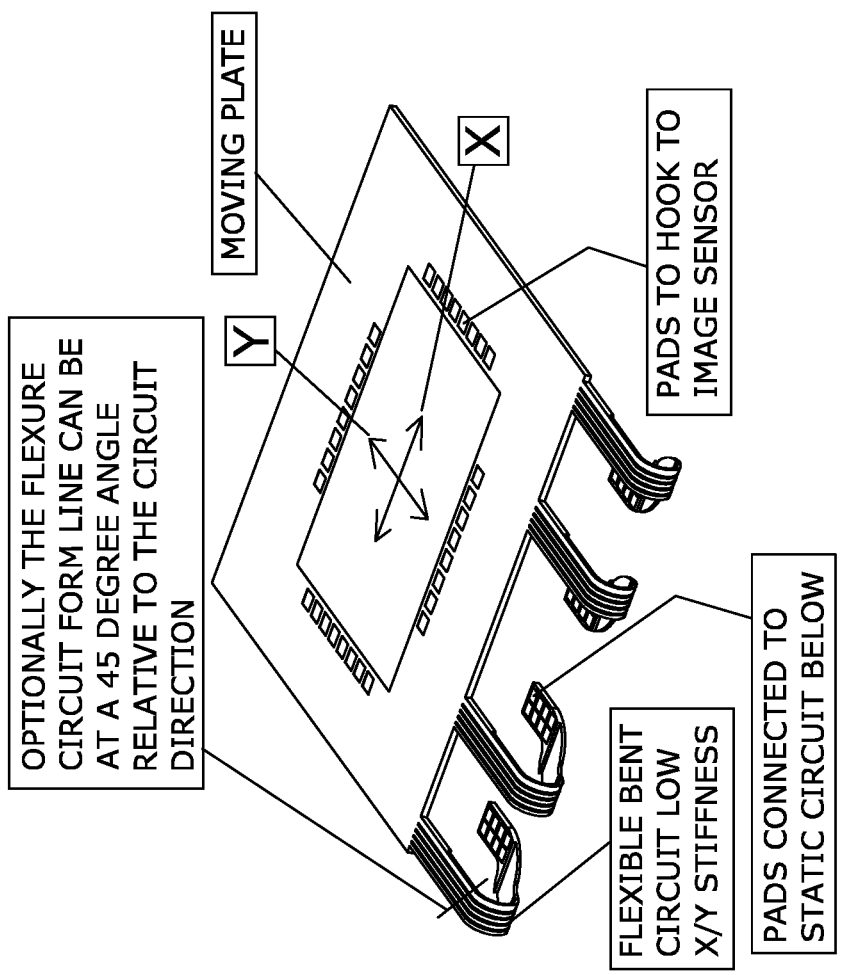
FIG. 21 illustrates half barrel roll interposer for an optical image stabilization suspension assembly according to an embodiment.
FIG. 22 illustrates a half barrel roll interposer in a flat state prior to being formed into the final state of the half barrel roll interposer such as that illustrated in FIG. 21.

FIG. 21 illustrates half barrel roll interposer for an optical image stabilization suspension assembly according to an embodiment. The half barrel roll interposer, according to some embodiments, is integrated into a moving member, such as those described herein. For other embodiments, the half barrel roll interposer is a separate component from a moving member and configured to attach to a moving member. The half barrel roll interposer includes one or more flexible circuits each with multiple traces that protrude off the side and are bent 180 degrees. The 180 degree bend makes the moving member flexible to move in the directions along the x-axis and the y-axis. For some embodiments, the 180 degree bend form line can be a 45 degree angle relative to the x and y axis. This would provide low and even resistance in movement in both the x and y axis. The circuit traces on the flexible circuits are connected to pads that are located around the image sensor on top of the half barrel roll interposer. The flexible circuits are configured to roll and twist during movement in the direction of the x and y axis. The flexible circuits include pads to connect to a static circuit below the half barrel roll interposer. Further, SMA wire and spring arms, such as those described herein, can be incorporated into the half barrel roll interposer. FIG. 22 illustrates a half barrel roll interposer in a flat state prior to being formed into the final state of the half barrel roll interposer such as that illustrated in FIG. 21.

Figure 25:
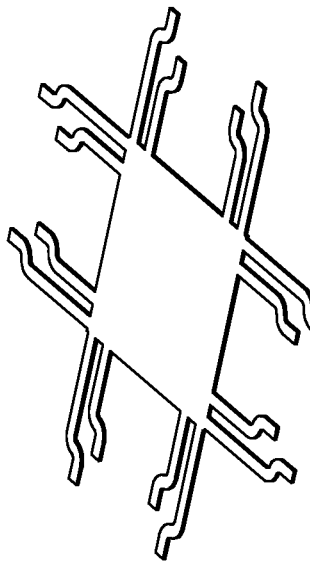
FIG. 25 illustrates interposer having flexible circuits protruding off 4 sides of the interposer in a flat state prior to being formed into the final state of the interposer such as that illustrated in FIG. 23.
Figure 24:
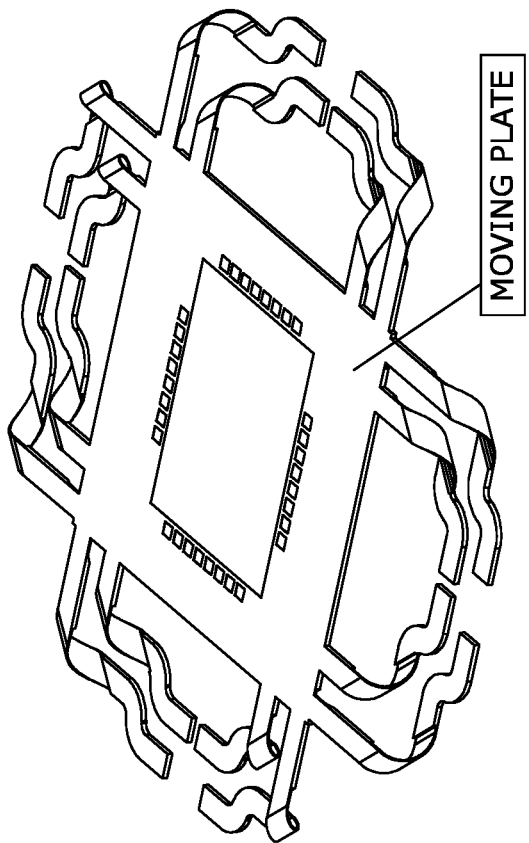
FIG. 24 illustrates an interposer including a 45 degree angled bend for an optical image stabilization suspension assembly according to an embodiment having flexible circuits.
Figure 23:
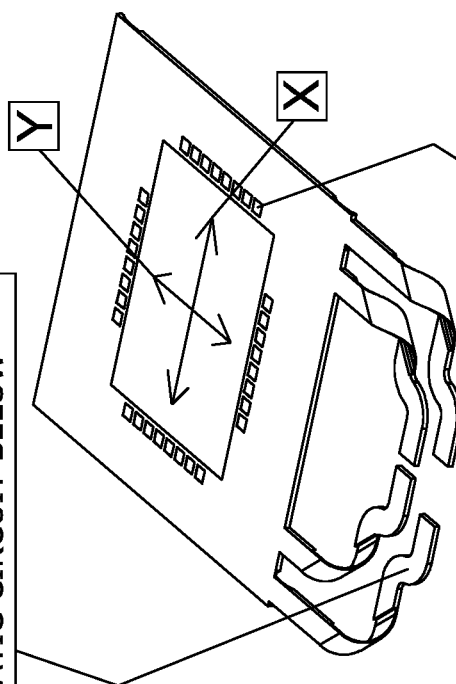
FIG. 23 illustrates an interposer including a 45 degree angled bend for an optical image stabilization suspension assembly according to an embodiment having flexible circuits.

FIG. 23 illustrates an interposer including a 45 degree angled bend for an optical image stabilization suspension assembly according to an embodiment. The interposer includes four flexible circuits, such as those described herein, that protrude off one side. The flexible circuits are formed at a 45 degree form line relative to the x axis and y axis in the plane of the moving member. For some embodiments, the flexible circuit has a reduced thickness of the flexible circuit in a bend region to further reduce the stiffness in the x-axis and the y-axis that provide easier movement in the direction of the x-axis and the y-axis. FIG. 24 illustrates an interposer including a 45 degree angled bend for an optical image stabilization suspension assembly according to an embodiment having flexible circuits, such as those described herein, protruding off 4 sides of the interposer. Interposers can be configured to have flexible circuits protrude off one to four sides of the interposer. FIG. 25 illustrates interposer having flexible circuits protruding off 4 sides of the interposer in a flat state prior to being formed into the final state of the interposer such as that illustrated in FIG. 24.

FIG. 26 illustrates a bottom side of a moving member including heat sink features of an optical image stabilization suspension assembly according to an embodiment. The heat sink features 2502 are located under the area where an image sensor 2508 is attached to the moving member 2522 and configured to aid in the removal of heat from the area around the image sensor 2508. The heat sink features 2502 can be created by metal etching or stamping grooves of various designs. Heat sing features may also include separate high conductivity materials that are attached to the bottom side of a moving member with conductive adhesives or solder. Highly conductive plating metals can be to the top and/or bottom side of the moving member on which the image sensor is attached. For some embodiments, vias can be formed into the moving members so highly conductive plating metals can more efficiently conduct heat from the top side to the bottom side heat sink features. FIG. 27 illustrates a cross sectional view from the bottom of a moving member including heat sink features of an optical image stabilization suspension assembly according to an embodiment. FIG. 28 illustrates a cross sectional view from the top of a moving member including heat sink features and conductive plating 2510 of an optical image stabilization suspension assembly according to an embodiment. The conductive plating 2510 can be gold, nickel, copper, or other material that helps to conduct heat from the image senor 2508. In addition to the heat sing features, according to some embodiments, the moving member 2522 includes vias formed in the moving member 2522 so conductive plating 2510 can more efficiently conduct heat from the top side to the bottom side heat sink features 2502.

FIG. 29 illustrates a moving member of an optical image stabilization suspension assembly according to an embodiment including vias and conductive plating. Vias 2802 are formed in a the base metal of a moving member 2822 of an optical image stabilization suspension assembly to create a heat path away from an image sensor 2808. For some embodiments, the vias 2802 are formed under the location of the image sensor 2808. The conductive plating 2810 is disposed on the top and bottom sides of the moving member 2822 and within the vias 2802 to form a heat path away from the image sensor 2808.

Figure 30:
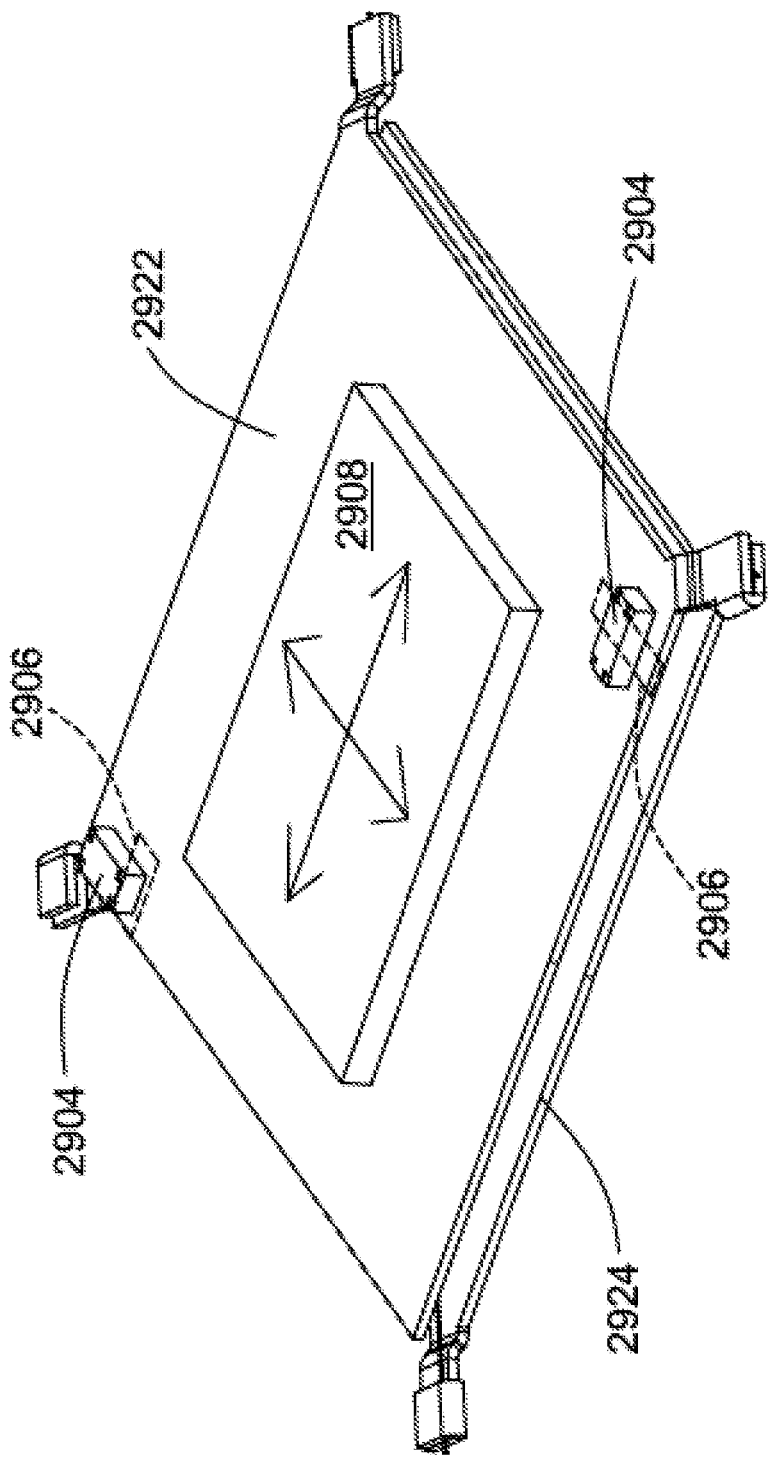
FIG. 30 illustrates an optical image stabilization suspension assembly according to an embodiment including one or more hall sensors.

FIG. 30 illustrates an optical image stabilization suspension assembly according to an embodiment including one or more hall sensors. The optical image stabilization suspension assembly includes a moving member 2922 and a static member 2924 configured to move an image sensor 2908 using techniques including those described herein. The optical image stabilization suspension assembly also includes one or more hall sensors 2904 placed on the moving member 2922. One or more magnets 2906 are placed on the static member 2924 near a respective hall sensor 2904. For some embodiments, the hall sensors 2904 are located on the moving member 2922 near magnets used in an autofocus assembly. Other embodiments include one or more hall sensors attached to the static member 2924 and one or more magnets attached to the moving member 2922. The position of the moving member 2922 in relation the static member 2924 is determined by sensing changes in the strength of the magnetic field generated by the one or more magnets 2906 using the one or more hall sensors 2904 using techniques including those known in the art.

FIG. 31 illustrates an exploded view of an optical image stabilization suspension assembly according to an embodiment including one or more capacitance probes as a movement sensor. The optical image stabilization suspension assembly includes a moving member 3022 and a static member 3024 configured to move an image sensor 3008 using techniques including those described herein. The optical image stabilization suspension assembly also includes one or more capacitance probes. The capacitance probe having a first portion 3004 formed on the moving member 3022 and a second portion 3006 formed on the static member 3024. The first portion 3004 and the second portion 3006 of the capacitive probe are formed of a conductive material such as copper and gold plated. The first portion 3004 and the second portion 3006 can be circular, rectangular, or triangular shape. The shapes can be designed to increase the amount of capacitance change seen when the moving member 3022 moves in one direction verses the other direction. So, one capacitance probe can be designed to only sense motion along an x-axis and the other capacitance probe can sense motion along a y-axis. Motion is determined by creating a change in overlapping area between the first portion 3004 and the second portion 3006. For example, more capacitance means the moving member 3022 moved in one direction in relation to the static member 3024. Less capacitance, as illustrated in FIG. 32, means the moving member 3022 moved in an opposite direction with respect to the static member 3024. As illustrated in FIG. 33, when the area of overlap of the first portion 3004 and the 3006 is the same for each capacitor probe, the capacitance with be about the same indicating that nominal or center position of the optical image stabilization suspension assembly.

According to embodiments, electrical leads or traces are connected to the first portion 3004 and the second portion 3006 of the capacitance probe using flexible circuits or connectors. The distance between the moving member 3022 and the static member 3024 can be adjusted for a desired nominal capacitance value. Reduced distance between the 2 plates of the capacitor probe will give a higher capacitance. This distance will then be held constant as the moving member 3022 moves in the direction of the x-axis and the y-axis.

Figure 34:
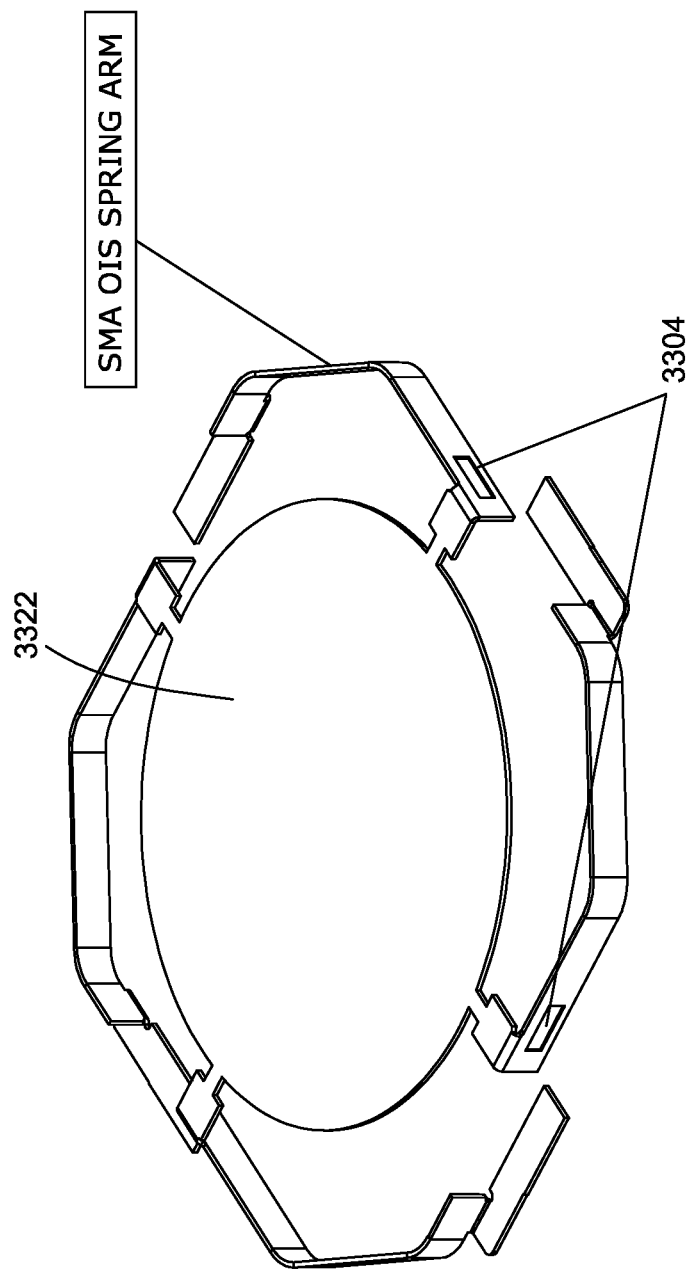
FIG. 34 illustrates an optical image stabilization suspension assembly according to an embodiment including a strain gage as a movement sensor.

FIG. 34 illustrates an optical image stabilization suspension assembly according to an embodiment including a strain gage as a movement sensor. The optical image stabilization suspension assembly includes a moving member 3322 including spring arms according to embodiments described herein configured to move an image sensor using techniques including those described herein. The optical image stabilization suspension assembly includes one or more strain gage sensors 3304 attached to one or more of the spring arms. For some embodiments, a strain gage sensor 3304 is attached to a high stress region of a spring arm. When the moving member 3322 moves the spring arms will have strain that can be measured by a strain gage attached to it or built on top of it. By reading the various amounts of strain from multiple gages, full x/y position can be determined, for example using a controller with an algorithm. Such a strain gage sensor 3322 includes those similar to and manufactured by processes such as those described in Bennin et al. U.S. Pat. No. 8,941,951 and Evans et al. U.S. Pat. No. 5,862,015.

Another implementation of a movement sensor includes a feedback position sensor using lens fiducial with image controller tracking algorithm. According to some embodiments, the lens is static in the direction of the x-axis and the y-axis. A mark or fiducial is formed on one of the lens of the camera system that can be seen by the image sensor. For example, the fiducial can be on the far edges of a lens and therefore far edges of the image circle on the image sensor and in an area of the image that is cropped off of the saved picture. Another example includes having a fiducial on structure in the camera system other than on the lens that is within the sensing range of the image sensor. The camera's controller is configured to track the position of the one or more fiducials to determine which pixel of the sensor it is using. The position of one or more fiducials would feedback to through the controller to the optical image stabilization suspension assembly to move the assembly to make position corrections.

Figure 35:
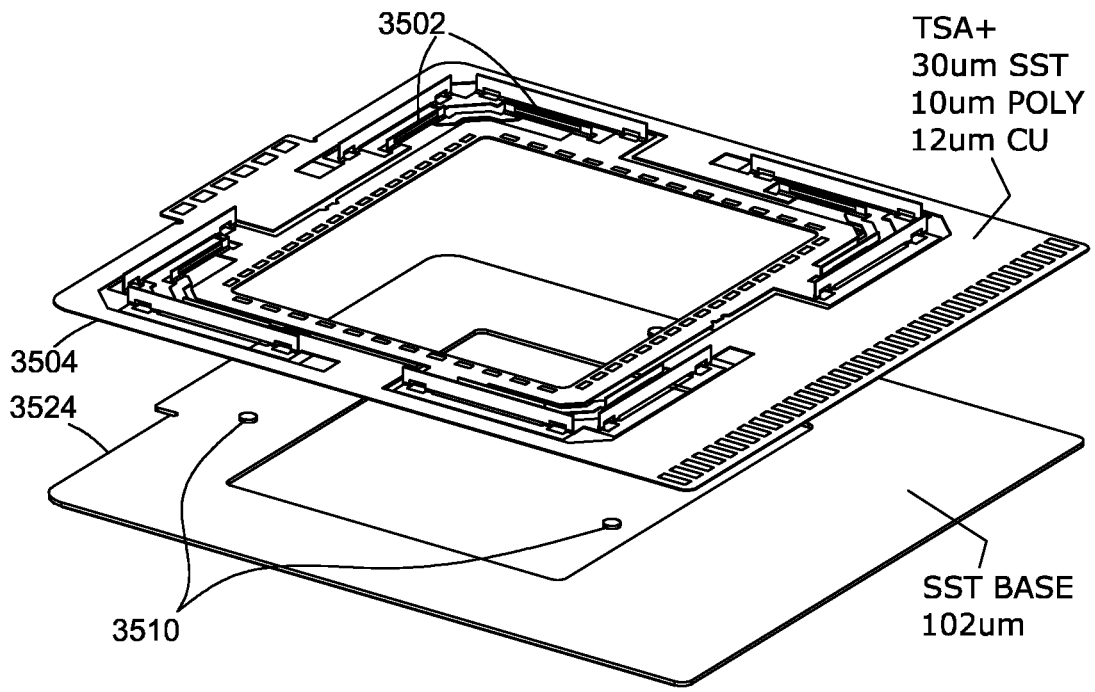
FIG. 35 illustrates an exploded view of an optical image stabilization suspension assembly implemented as a bimetallic actuator according to an embodiment.
Figure 36:
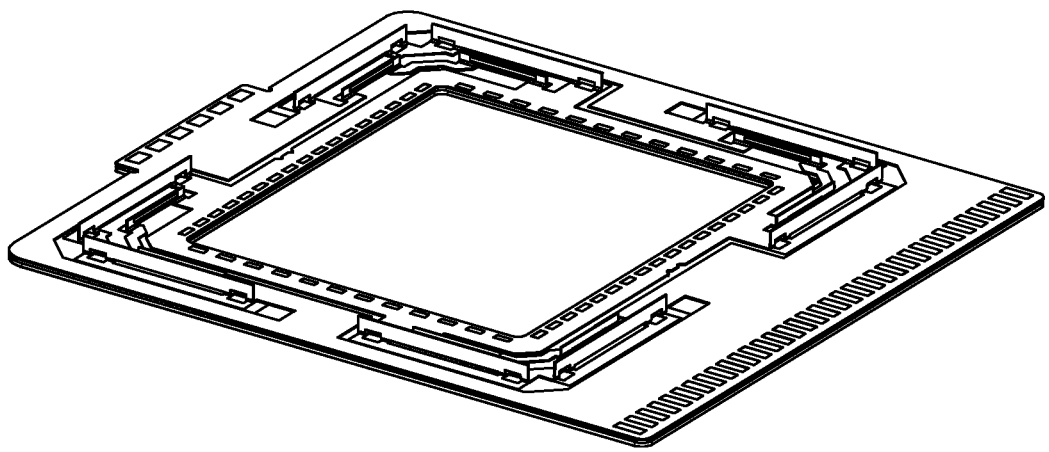
FIG. 36 illustrates a perspective view of the an optical image stabilization suspension assembly implemented as a bimetallic actuator illustrated in FIG. 35.

FIG. 35 illustrates an exploded view of an optical image stabilization suspension assembly implemented as a bimetallic actuator according to an embodiment. Such an bimetallic actuator is an integrated SMA Bimorph X/Y actuator with sensor shift traces as a movement sensor. As illustrated in FIG. 35, the integrated SMA Bimorph X/Y actuator includes 2 SMA actuators 3502 in each corner of the integrated SMA bimorpth X/Y actuator 3504. The integrated SMA bimorph X/Y actuator 3504 is configured to rest on one or more slide bearings 3510 on a base member 3524. Any number of slide bearings 3510 may be used. Some embodiments include three slide bearings 3510. The slide bearings 3510 can be made from a low friction material to better enable relative sliding between the integrated SMA bimorpth X/Y actuator 3504 and the base member 3524. For some embodiments, the slide bearings 3510 are ball bearings with features formed on base member 3524 to contain the ball bearings. FIG. 36 illustrates a perspective view of the an optical image stabilization suspension assembly implemented as a bimetallic actuator illustrated in FIG. 35.

Figure 37:
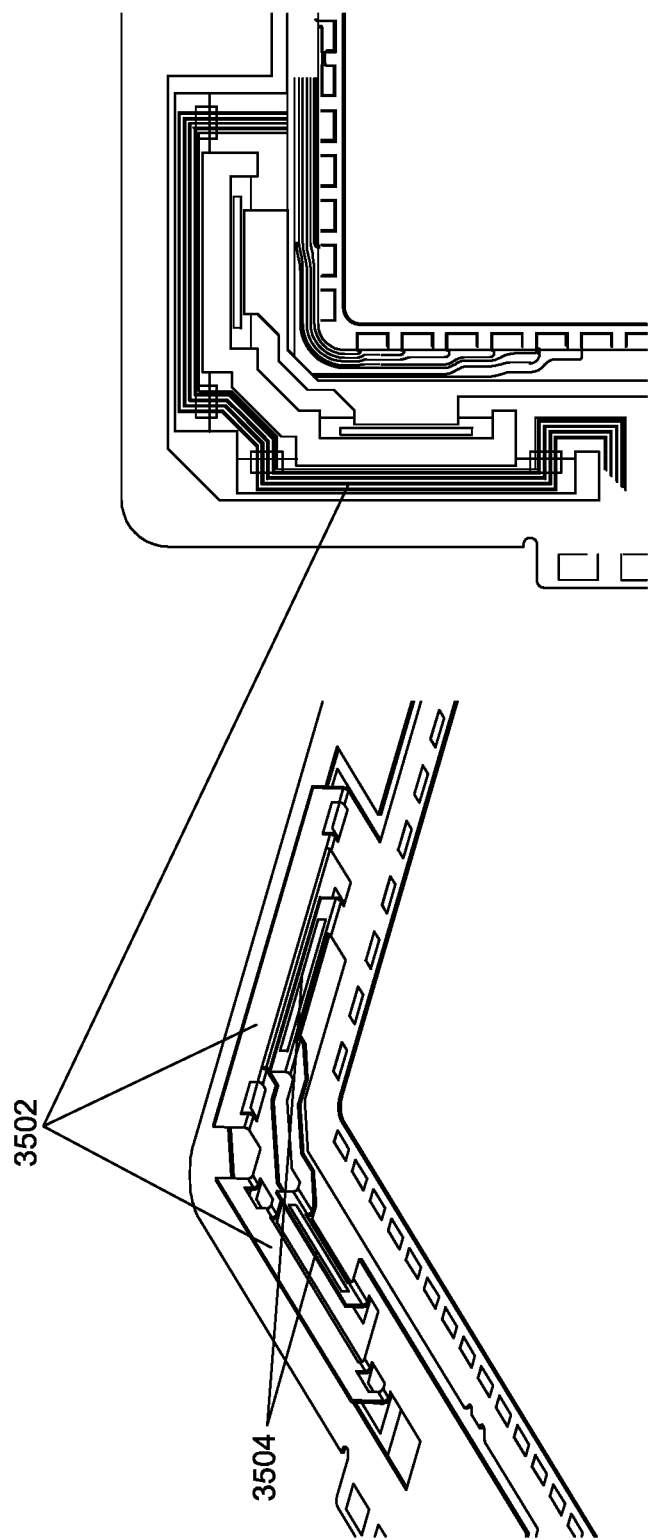
FIG. 37 illustrates a section of the bimetallic actuator according to an embodiment including bimorph actuators on the inner rails, flexible trace routing on the outer rails, and movement sensors such as those described herein.
Figure 38:
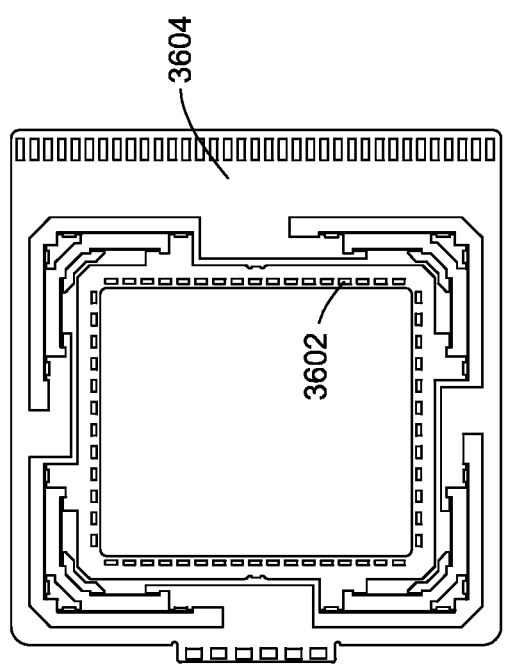
FIG. 38 illustrates a top view of the bimetallic actuator according to an embodiment which includes the moving portion and a fixed portion.
Figure 39:
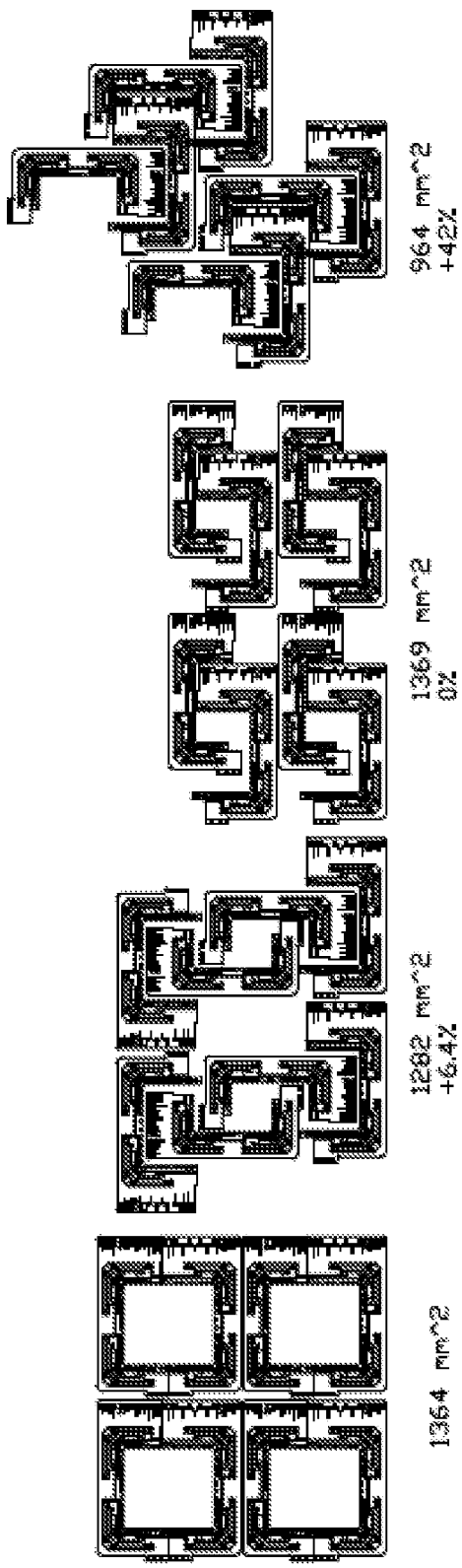
FIG. 39 illustrates layout patterns for forming the integrated SMA bimorpth X/Y actuator according to an embodiment.

FIG. 37 illustrates a section of the bimetallic actuator according to an embodiment including bimorph actuators 3504 on the inner rails, flexible trace routing 3506 on the outer rails, and movement sensors such as those described herein. The trace routing 3506 is configured to transmit electrical signals to components including activation signals to the bimorph actuators 3504. The pair of bimorph actuators 3504 in each corner of the integrated SMA bimorph X/Y actuator 3504 are formed using SMA material that when activated using techniques described herein create a moving portion 3602 as illustrate in FIG. 38. FIG. 38 illustrates a top view of the bimetallic actuator according to an embodiment which includes the moving portion 3602 and a fixed portion 3604. The fixed portion is attached to the base member 3524. The fixed portion 3604 is attached to the base member 3524 by techniques including, but not limited, to adhesive and solder. Thus, the moving portion 3602 is configured to move in the direction of the x-axis and the y-axis relative to the fixed portion 3604 and the base member 3524. Further, a movement sensor such as those described herein is also integrated into integrated SMA bimorph X/Y actuator 3504. FIG. 39 illustrates layout patterns for forming the integrated SMA bimorpth X/Y actuator using etching and deposition techniques including those known in the art.

Figure 40:
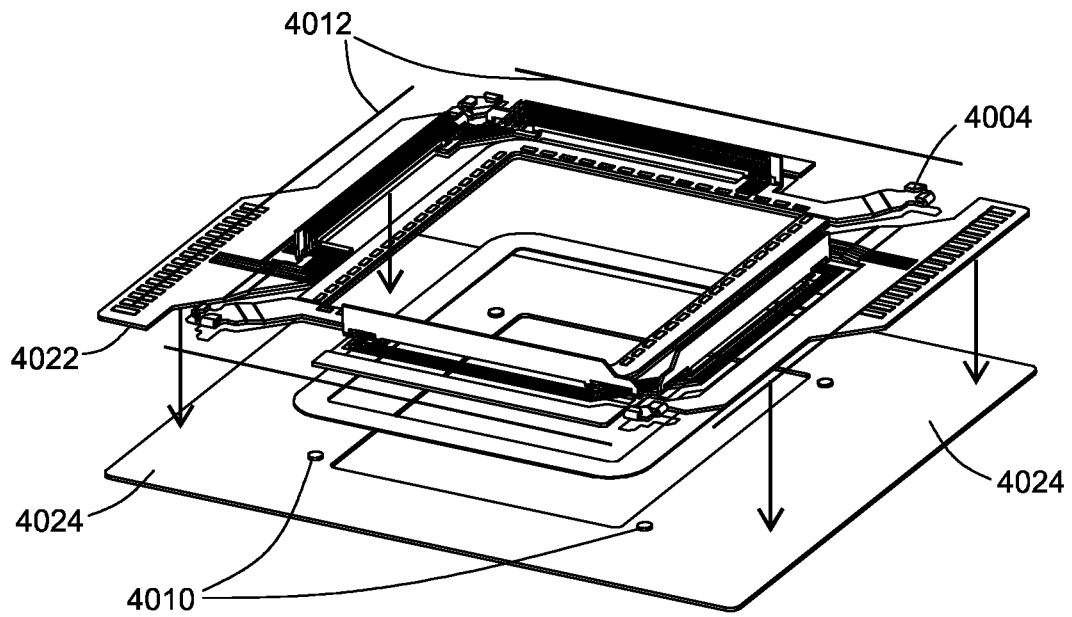
FIG. 40 illustrates an exploded view of an optical image stabilization suspension assembly implemented as an integrated SMA actuator assembly according to an embodiment.

FIG. 40 illustrates an exploded view of an optical image stabilization suspension assembly implemented as an integrated SMA actuator assembly according to an embodiment. The integrated SMA actuator assembly includes wire crimps, traces, and a sensor using techniques described herein integrated in to the SMA actuator member 4022. The optical image stabilization suspension assembly is configured to have an image sensor disposed on and attached to SMA actuator member 4022. The SMA actuator member 4022 includes wire crimps 4004 for attaching four SMA wires 4012 to the SMA actuator member 4022 using techniques including those described herein. According to some embodiments, wire crimps 4004 are configured as a one or more crimp sub-assemblies, where each crimp sub-assembly includes a static and a moving crimp. The SMA actuator member 4022 is configured to attach to a base member 4024. The base member 4024, according to some embodiments, also includes one or more slide bearings 4010 as described herein. Any number of slide bearings 4010 may be used and any configuration.

Figure 41:
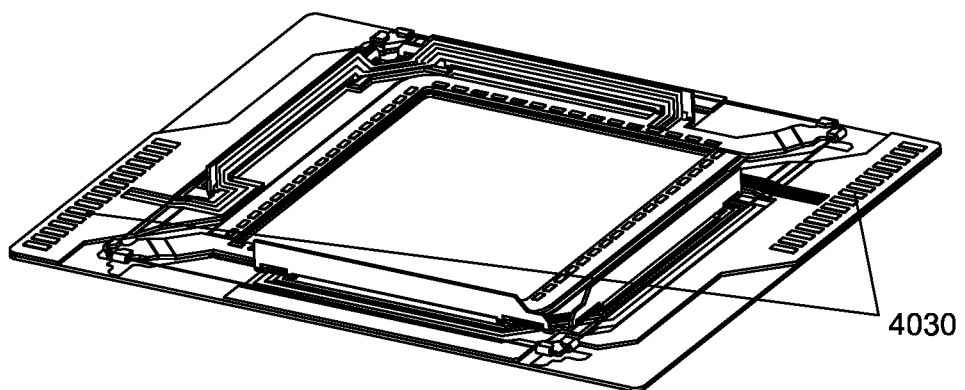
FIG. 41 illustrates a perspective view of an optical image stabilization suspension assembly implemented as an integrated SMA actuator assembly as illustrated in FIG. 40.
Figure 44:
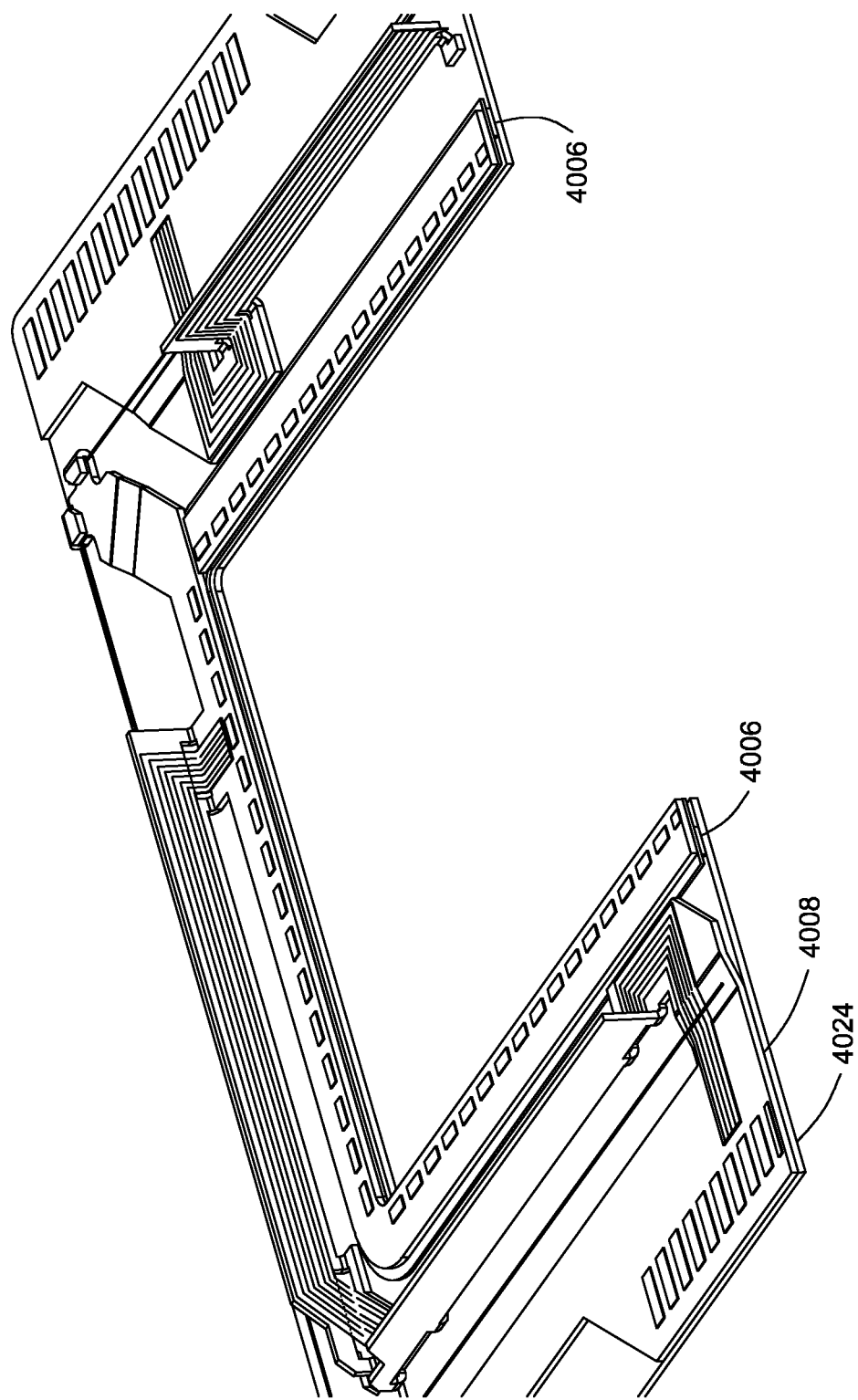
FIG. 44 illustrates a cross section of an optical image stabilization suspension assembly implemented as an integrated SMA actuator assembly according to an embodiment.

FIG. 41 illustrates a perspective view of an optical image stabilization suspension assembly implemented as an integrated SMA actuator assembly as illustrated in FIG. 40. The SMA actuator member 4022 includes trace termination pads on opposing sides of the SMA actuator member 4022 for providing electrical signals via traces on the member. FIG. 42 illustrates a perspective view of an optical image stabilization suspension assembly implemented as an integrated SMA actuator assembly according to an embodiment. The SMA actuator includes trace rails 4220 formed on spring arms configured to center the SMA actuator using techniques including these described herein. The trace rails 4220 for some embodiments include 16 traces on each of the 2 spring arms. FIG. 43 illustrates a side view of an optical image stabilization suspension assembly implemented as an integrated SMA actuator assembly according to an embodiment. The trace rails 4220, according to some embodiments are formed at 90 degree angle to reduce the stiffness in the direction of the x-axis and the y-axis. FIG. 44 illustrates a cross section of an optical image stabilization suspension assembly implemented as an integrated SMA actuator assembly according to an embodiment. The integrated SMA actuator includes a moving portion 4006 and a fixed portion 4008. The fixed portion 4008 is attached to the base member 4024. The fixed portion 4008 is attached to the base member 4024 by techniques including, but not limited, to adhesive and solder. Thus, the moving portion 4006 is configured to move in the direction of the x-axis and the y-axis relative to the fixed portion 4008 and the base member 4024. Further, a movement sensor such as those described herein is also integrated into integrated actuator.

Although the invention has been described with reference to different embodiments, those of skill in the art will recognize that changes can be made in form and detail without departing from the spirit and scope of the invention. For example, although described as dual camera assemblies, other embodiments of the invention are configured for three or more cameras. Features of the different illustrated embodiments can be combined with one another in still other embodiments. The specification and drawings are, accordingly, to be regarded in an illustrative rather than a restrictive sense.

What is claimed is:

1. An actuator comprising:
   a static base member;
   a moving member movable about an x-axis and a y-axis with respect to the static base member, the moving member including at least one corner with at least one inner rail; and
   at least a first actuator and a second actuator, wherein each of the first and second actuators including separate shape memory alloy (SMA) elements each of the actuators positioned on the at least one inner rail of the moving member at opposing sides of the at least one corner of the at least one inner rail such that the first actuator is disposed substantially perpendicular to the second actuator, and coupled to the static base member and moving member, wherein the first actuator and second actuator, when driven by a controller, move the moving member about the x-axis and the y-axis, respectively, with respect to the static base member.

2. The actuator of claim 1, further including a flexible circuit positioned on at least one outer rail of the moving member and configured to transmit electrical signals to the one or more actuators.

3. The actuator of claim 2, wherein two outer rails of the at least one outer rail form about a ninety (90) degree angle at the least one corner to reduce stiffness about the x-axis and the y-axis.

4. The actuator of claim 1, further comprising a sensor mounting region on the moving member.

5. The actuator of claim 4, further comprising an image sensor disposed on the sensor mounting region on the moving member, wherein the SMA elements, when driven by a controller, move the image sensor thereon about the x-axis and the y-axis with respect to the static base member.

6. The actuator of claim 1, further comprising one or more crimp sub-assembly, the one or more crimp sub-assembly including a static crimp and a moving crimp.

7. The actuator of claim 1, comprising one or more bearings enabling movement of the moving member with respect to the static base member.

8. The actuator of claim 1, further including one or more springs coupling the moving member to the static base member.

9. The actuator of claim 8, wherein one of the one or more springs includes a spring arm, the spring arm includes the at least one outer rail and configured to center the moving member about the static base member.

10. The actuator of claim 1, further including one or more flexible circuit connectors including electrical traces extending from the moving member.

11. A suspension assembly comprising:
    an actuator comprising:
      a static base member;
      a moving member movable about an x-axis and a y-axis with respect to the static base member, the moving member including at least one corner with at least one inner rail; and
      at least a first actuator and a second actuator, wherein each of the first and second actuators including separate shape memory alloy (SMA) elements, each of the actuators positioned on the inner rails of the moving member at opposing sides of the at least one corner of the at least one inner rail such that the first actuator is disposed substantially perpendicular to the second actuator, and coupled to the static base member and moving member, wherein the first actuator and second actuator, when driven by a controller, move the moving member about the x-axis and the y-axis, respectively, with respect to the static base member.

12. The suspension assembly of claim 11, further including flexible trace circuit positioned on at least one outer rail of the moving member and configured to transmit electrical signals to the one or more actuators.

13. The suspension assembly of claim 12, wherein two outer rails of the at least one outer rail form a ninety (90) degree angle at the least one corner to reduce the stiffness in the direction of the x-axis and the y-axis.

14. The suspension assembly of claim 11, further comprising a sensor mounting region on the moving member.

15. The suspension assembly of claim 14, further comprising an image sensor disposed on the sensor mounting region on the moving member, wherein the SMA elements, when driven by a controller, move the image sensor thereon about the x-axis and the y-axis with respect to the static base member.

16. The suspension assembly of claim 11, further comprising one or more crimp sub-assembly, the one or more crimp sub-assembly including a static crimp and a moving crimp.

17. The suspension assembly of claim 11, comprising one or more bearings enabling movement of the moving member with respect to the static base member.

18. The suspension assembly of claim 11, further including one or more springs coupling the moving member to the static base member.

19. The suspension assembly of claim 18, wherein one of the one or more springs includes a spring arm, the spring arm includes the at least one outer rail and configured to center the moving member about the static base member.

20. The suspension assembly of claim 11, further including one or more flexible circuit connectors including electrical traces extending from the moving member.

\* \* \* \* \*